INVENTORS
ROBERT W. CHANG
CHARLES M. DORSEY, JR.
LESTER R. YATES
JOSEPH J. SAWICKI

BY Killman & Lamb

ATTORNEYS

INVENTORS: ROBERT W. CHANG, CHARLES M. DORSEY, Jr.
LESTER R. YATES, JOSEPH J. SAWICKI
BY Killman & Lamb
ATTORNEYS

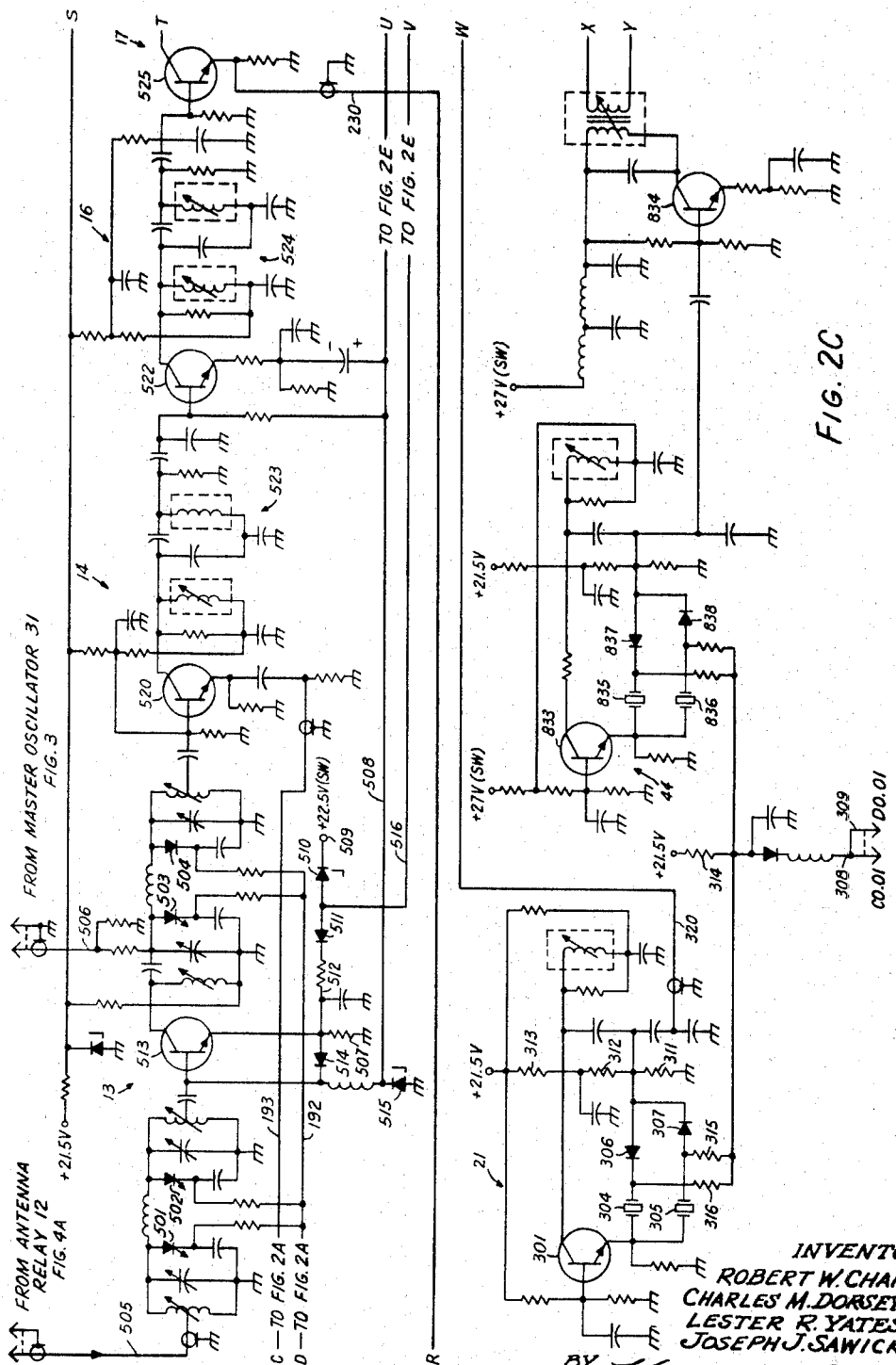

INVENTORS
ROBERT W. CHANG
CHARLES M. DORSEY, JR.
LESTER R. YATES
JOSEPH J. SAWICKI

BY
Killman & Lamb
ATTORNEYS

INVENTORS
ROBERT W. CHANG
CHARLES M. DORSEY, Jr.
LESTER R. YATES
JOSEPH J. SAWICKI
BY
Killman & Lamb
ATTORNEYS

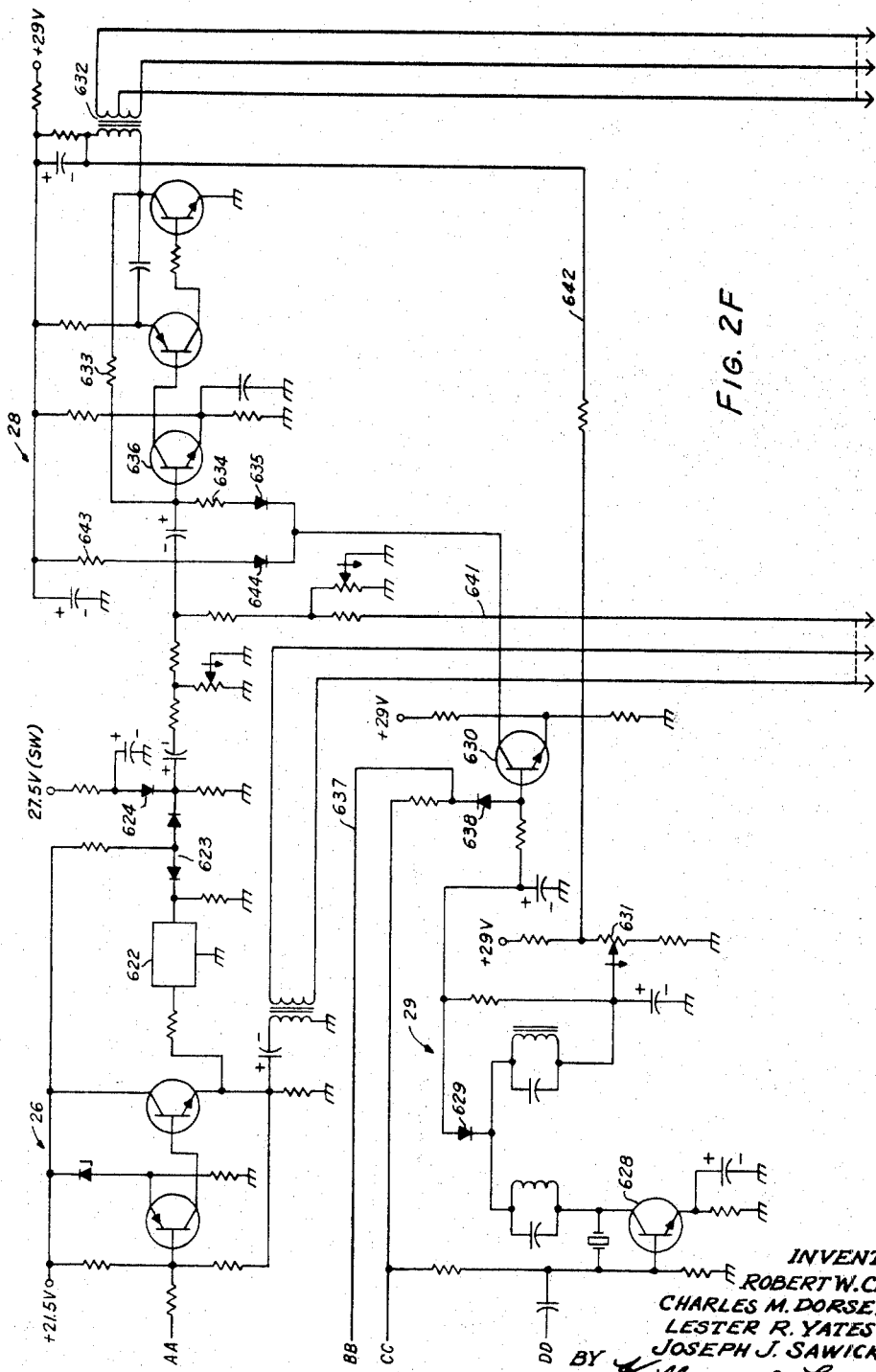

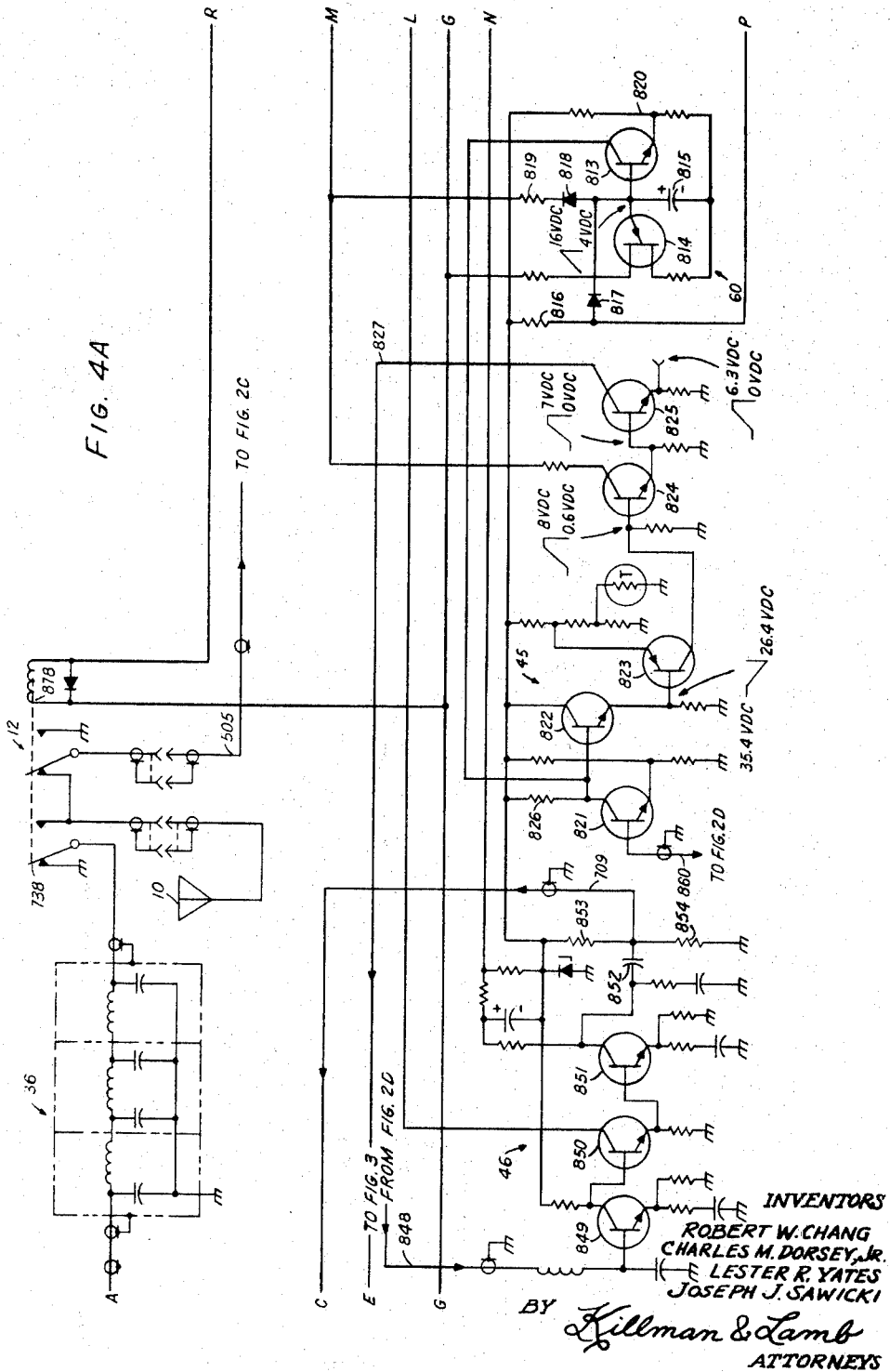

United States Patent Office 3,413,554
Patented Nov. 26, 1968

3,413,554
TRANSCEIVER WITH SELF-TUNING TRANSMITTER CONTROLLED BY RECEIVER
Lester R. Yates, Towson, and Charles M. Dorsey, Jr., and Joseph J. Sawicki, Baltimore, Md., and Robert W. Chang, West Lafayette, Ind., assignors to The Bendix Corporation, Towson, Md., a corporation of Delaware
Filed May 3, 1965, Ser. No. 452,514
10 Claims. (Cl. 325—17)

ABSTRACT OF THE DISCLOSURE

A radio transceiver having a self-tuning transmitter variable frequency master oscillator wherein a portion of the master oscillator output frequency is applied to the receiver mixer and the developed receiver intermediate frequency is compared with a reference frequency in a phase detector to generate the master oscillator control signal. Actuation of a transmit switch causes a search signal to be applied to the master oscillator so as to sweep the master oscillator rapidly over its entire range. Upon the appearance of a receiver intermediate frequency signal at an I.F.-detector and transmit enable circuit and the simultaneous indication by the phase detector that it is within its pull-in range, the transmit enable circuit will energize the transmitter power amplifier and actuate the antenna relay so as to connect the transmitter output to the antenna.

Additionally, oscillator crystals and pretuned tank circuits are selected to control the frequency of the receiver local oscillators and a reference oscillator. Frequency determinative crystals and pretuned tank circuit elements are isolated from their respective oscillators by diodes normally biased nonconductive. By proper selection of forward biasing voltages, those diodes can be made conductive which will introduce the proper crystals and circuit loading to the oscillators.

---

The present invention relates to radio receiving and transmitting apparatus. It is particularly directed to radio communications systems in which the receiver and transmitter are automatically tuned upon selection of a channel from amongst a plurality of crystal-controlled channels.

The high volume of radio traffic necessitated by extensive military and civil air operations, as well as the highly developed uses of radio for entertainment purposes, has imposed increasingly severe restrictions on use of the medium. Very accurate control of frequency is required. Channels must be closely spaced and limited as to bandwidth to the minimum amount permissible for intelligible communication. One frequency band presently reserved for aeronautical use extends from 116.000 mc. to 150.000 mc. The band is divided into 1360 channels spaced 25 kc. apart. The requirements for tuning accuracy in both transmitter and receiver are apparent. Crystal control of frequency is the only practical means presently providing stable repeatable results.

An unimaginative apparatus design would include at least one transmitter crystal and one receiver crystal for each channel of the band, thus requiring more than 2500 crystals for complete coverage and introducing formidable switching problems. Present designs are fortunately advanced well beyond this primitive state. A single set of crystals may serve both the receiver and the transmitter since neither operates simultaneously. The number of crystals required is thus reduced by one-half. Various heterodyning arrangements are employed permitting frequency to be controlled as the sum or difference of the fundamental frequencies of two or more crystals. Each stage of frequency conversion therefore affords opportunity for reducing the number of crystals required to cover a frequency band in discrete frequency steps.

United States Patent No. 2,902,596 to Rockwell et al. describes a transmitter receiver remotely tunable to any one of 280 channels by selecting combinations from amongst 24 crystals. The Rockwell et al. tuning system includes means not only for reducing the number of crystals required but also provides means for tuning the loads of the crystal oscillators and the resonant circuits of several selective amplifiers. The latter means contend with an additional problem in the design of wide frequency range equipment. The frequency of oscillation of a crystal oscillator is not critically dependent upon the tuning of the oscillator load. Nevertheless the load must be tuned reasonably close to the resonant frequency of the crystal in order to provide the proper reactive feedback component to sustain oscillations. For this reason, the substitution of crystals differing by more than about 10% in frequency must generally be accompanied by a retuning of the oscillator load. The wide range oscillator of Rockwell et al. is tuned by physically substituting both crystals and loads in the oscillator circuit. The substitution is accomplished by mechanical means which also supplies a shaft rotation for adjusting variable capacitors to tune selective amplifiers. The mechanism is as complex as might be expected and suffers from the usual complaints of precision machines. Furthermore, the means for using the crystal bank in transmission is lacking in electrical efficiency. The crystals are made to serve both transmitter and receiver by reversing the signal paths through the system. That is, an incoming signal is mixed with the output of a high frequency crystal oscillator for downward conversion of frequency to the first intermediate frequency. The first intermediate frequency signal is then mixed with the output of a second low frequency crystal oscillator for further downward conversion of frequency to the second intermediate frequency. For transmission, the modulated output of a low frequency side step oscillator is mixed with the low frequency crystal oscillator output for a first upward conversion of frequency. The higher frequency is again converted upwards by mixing with the output of the high frequency crystal oscillator. Finally the high frequency beat signal is amplified to a high power level for radiation at the same frequency as the received signal. The generation of the transmitter signal in such manner involves the production of large numbers of sideband frequencies at each stage of conversion, only one of which is desired. Consequently each stage of frequency conversion must be followed by highly selective circuits designed to reject all but the desired frequency. The final power amplifiers must also be tuned to reject all but the desired frequency signal else frequencies likely to interfere with other communication channels will be radiated.

One of the objects of this invention is to provide a transmitting-receiving system entirely tuned electronically. Circuits have heretofore been tuned electronically by voltage variable capacitors or current variable inductors. The profusion of variably tuned circuits required in crystal saving systems complicates the adaptation of such systems to electronic tuning. In the transmitter increasingly high power levels are encountered in the tuned circuits, shortly reaching a level too great to be handled by voltage variable capacitors. Resort must then be taken to current variable inductors. But the characteristics of current variable inductors are notoriously unstable. The problem of achieving proper frequency tracking of the numerous cascaded tuned circuits in a system such as described by Rockwell et al. is practically insolvable by electronic means and yet it is not especially difficult to solve by mechanical means.

Another object of the invention is to provide an electronically tuned transmitter highly stable in frequency and which utilizes a minimum of variably tuned circuits. It will be appreciated that one way of achieving the foregoing objects is to generate the transmitter signal at the frequency to be radiated. Thus the numerous buffer stages and sideband rejection circuits required for the heterodyne method of frequency generation are avoided. The means for stabilizing the frequency of the oscillator are yet to be discussed.

Briefly, the present invention utilizes the receiver as a frequency meter for the transmitter oscillator. The receiver is accurately tuned by electronically selected crystals and electronically tuned circuits. The transmitter oscillator includes electronically variable tuning elements which are controlled as a function of the phase difference between the receiver output and a stable reference oscillator.

Thus further advantages of the invention reside in the elimination of moving parts from the tuning system. The time required for tuning a selected channel is reduced to a negligibly small amount. The reliability of the system is very much improved over an equivalent mechanically tuned system. Since the transmitter output is continuously monitored to develop frequency control, immediate warning of a fault within the system is given the operator.

Other advantages plainly attend the elimination of mechanical tuning means. For instance, the bulk and weight of the equipment is significantly reduced. The rapid shift of communications channels enabled by electronic tuning allows the equipment to be operated on one channel, say for the transmission of digital data and, without perceptible pause, to be shifted to another channel for voice communications.

In the drawings:

FIGS. 2a–2f, 3, 4a and 4b are schematic diagrams of the invention; and

Figure 1:
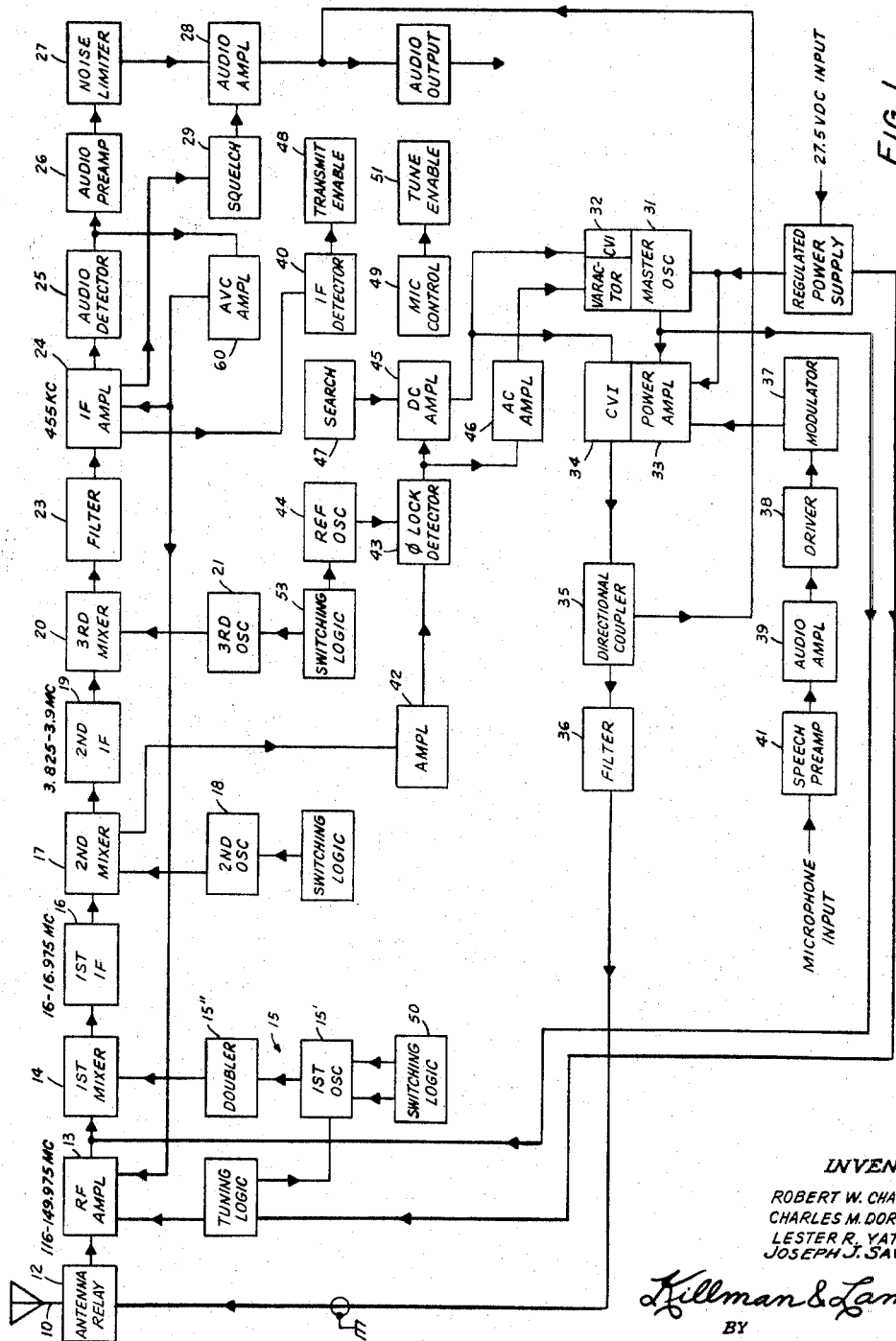
FIG. 1 is a functional block diagram of the invention.

The invention as applied to a receiver-transmitter operating in the frequency band 116–150 mc. appears in the block diagram of FIG. 1. An antenna 10 is coupled through a transfer relay 12 either to the input of the receiver R.F. amplifier 13 or to the transmitter output. The receiver comprises principally those elements extending along the upper row of the diagram while the elements forming the transmitter extend principally along the bottom row. Amplifier 13 supplies signal to a first mixer which combines the signal with the output of a first local oscillator 15 for conversion to the first intermediate frequency.

The first local oscillator includes a crystal controlled oscillator 15′ covering the frequency band of 50 to 66.5 in 34 steps and a frequency doubler 15″. The injection frequency of the first local oscillator therefore covers a range of 100–133 mc., yielding a first I.F. varying from 16–16.975 mc. in steps corresponding to the channel spacing, which may be 25 or 50 kc. each. The output of mixer 14 is amplified in the first I.F. amplifier 16 and converted downward to the second intermediate frequency in the second mixer 17. The injection frequency of the second mixer is supplied by a second local oscillator 18, crystal controlled through a frequency range of 19.9–20.8 mc. in 0.1 mc. steps. Appropriate selection of the second local oscillator frequency therefore provides second intermediate frequencies ranging from 3.825–3.9 mc. in four 25 kc. steps, assuming 25 kc. signal channel spacing. A third mixer 20 follows a second I.F. amplifier 19 for conversion of the signal to the third intermediate frequency. The third mixer combines the second I.F. signal with the output of a third local oscillator 21, crystal controlled in four frequency steps ranging between 3.37 and 3.445 mc. to produce a constant third intermediate frequency of 455 kc. The third mixer output is filtered using either a 20 kc. bandwidth filter 22 or a 40 kc. bandwidth filter 23, both centered on 455 kc., prior to amplification in the third I.F. amplifier 24. The filters aid in the rejection of image frequencies, the narrower band filter being inserted for 25 kc. channel spacing. An audio detector 25 recovers the voice signal from the output of the third I.F. amplifier, whence it is further processed in an audio filter 26, a noise limiter 27 and an audio amplifier 28. A squelch circuit 29 disables the audio amplifier 28 in the absence of signal.

The transmitter comprises generally those elements extending along the lower row of FIG. 1. A master oscillator 31 tunable through a frequency band of 116–150 mc. by means of a current variable inductor 32 drives a power amplifier 33 tuned to the frequency of master oscillator 31 by a current variable inductor 34. The transmitter signal is fed at full power through a directional coupler 35 and filter 36 to the antenna transfer relay 12. The directional coupler extracts a small portion of the outgoing signal for sidetone generation. The absence of sidetone therefore immediately warns the operator of lack of transmitter signal. The transmitter signal is modulated in the power amplifier 33 by a modulator 37 and driver 38 fed by the microphone signal amplified in audio amplifiers 39 and 41.

The frequency of the transmitter is controlled by applying an attenuated portion of the output of master oscillator 31 to the input of the receiver first mixer 14. When the transmitter is tuned reasonably close to the receiver, signal will pass the first I.F. amplifier 16 and be converted in the receiver second mixer 17 to a signal approaching the second intermediate frequency. The converted transmitter signal is amplified in a wideband amplifier 42 and supplied as one input to a phase detector 43. A reference frequency input to phase detector 43 is supplied by a crystal-controlled reference oscillator 44 having a frequency precisely equal to the on-channel second intermediate frequency of the receiver. The phase detector produces a direct current output proportional to the phase difference between the reference frequency and the converted transmitter frequency. This output is amplified in direct coupled amplifiers 45 and 46 for control of the variable reactance elements of master oscillator 31. When the phase difference between signal of the reference oscillator 44 and the converted transmitter signal of amplifier 42 reaches the pull-in range of the phase lock system, the transmitter oscillator is rapidly stabilized at a fixed phase difference with the reference oscillator. This phase difference can only be constant with a transmitter frequency equal to the selected receiver channel frequency.

The pass band of the receiver first I.F. amplifier and the pull-in range of the phase lock system are both limited. The transmitter frequency must approach reasonably close to the receiver channel frequency before stabilization can occur. A search circuit 47 is therefore provided for the purpose of sweeping the transmitter through the receiver operating band. When the transmitter frequency nears the channel to which the receiver is tuned a frequency component will pass through the receiver to a tuning detector 40. Output from detector 40 actuates a transmit-enable circle 48, one function of which is to stop the search generator, allowing the phase lock system to assume full control of the transmitter frequency.

The equipment operates as a receiver until it is desired to transmit. The transmitter is actuated by a switch, usually located on the microphone, which energizes a tune-enable circuit 51. The tune-enable circuit actuates the following circuits: master oscillator 31, modulator 37, and reference oscillator 44, all of which commence operation. In addition, the tune-enable circuit supplies control voltages to detune R.F. amplifier 13, to disable the final stage third I.F. amplifier 24 and to initiate the search generator 47. When the sweep output of the search generator causes the transmitter frequency to approach closely the receiver channel frequency selected for operation, search ends, as stated above, and the phase detector loop brings the master oscillator frequency precisely on channel. Simultaneously with the end of search, the transmitter power amplifier 33 is energized and the antenna relay 12 transfers the antenna from the receiver input to the transmitter output. Operation can then commence upon the selected channel. The whole of the transmitter tuning operation takes place within 30–100 milliseconds, depending upon the channel frequency, the largest time of which is smaller than any reported human reaction time. In other words, while a delay exists between each changeover from reception to transmission, the delay is so small as to be imperceptible by the operator, since he cannot close the transmit switch and commence talking before the transmitter is fully tuned.

The crystals which determine the operating frequency of the receiver, and hence the transmitter, are selected remotely by electrical switches which ground pairs of wires from five wire sets. One set of wires is provided for each variable digit of the frequency band. For example, in a transceiver tunable through the range of 118.000 mc. to 135.95 mc. in 50 kc. steps, one set of control wires is provided for the tens, units, tenths and hundredths of frequency. The tens and hundredths sets need not contain five wires, since the former set is only variable in three steps, and the latter set is variable in two steps.

The pairs of wires from a five wire set are grounded in a certain order which determines ten unique selections. The crystals selected by the grounded combinations of wires are placed in circuit with the oscillators by switching logic circuits 50, 52 and 53. The logic circuits sense the particular pair of grounded wires in a set and respond by establishing a conductive path between an oscillator and a particular crystal which establishes the frequency of oscillation at the selected value.

Figure 2A:
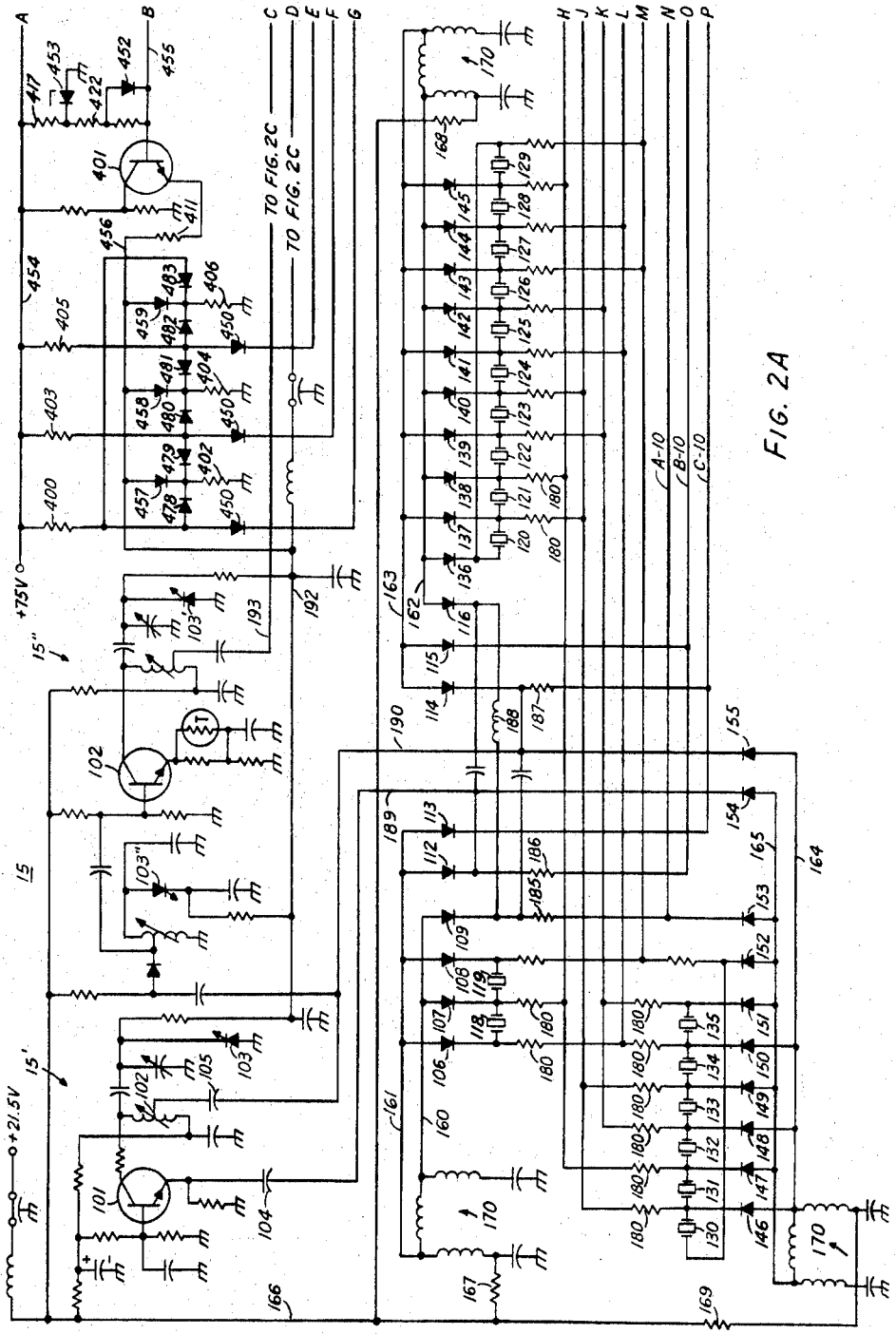
Figure 2B:
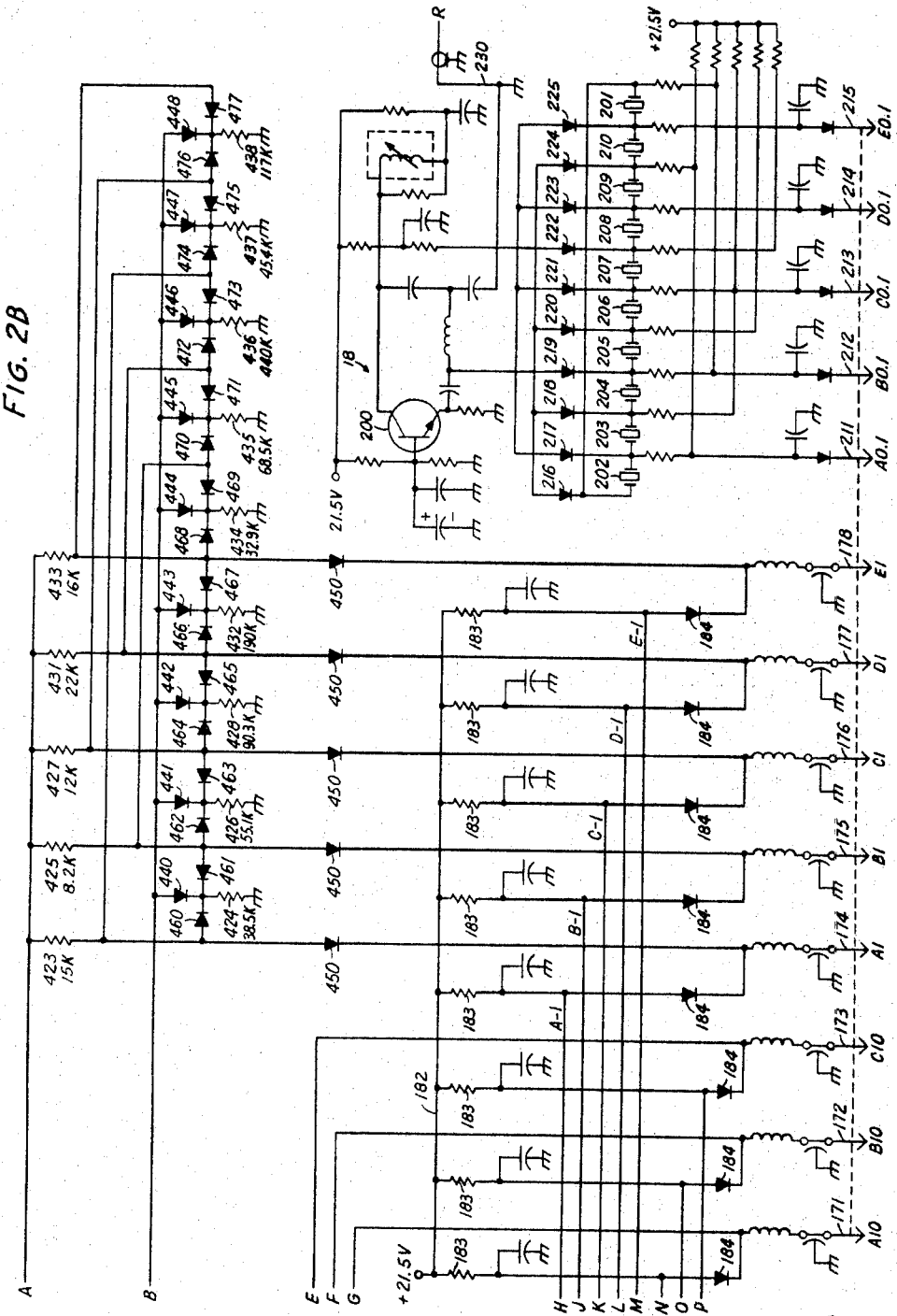
Figure 2D:
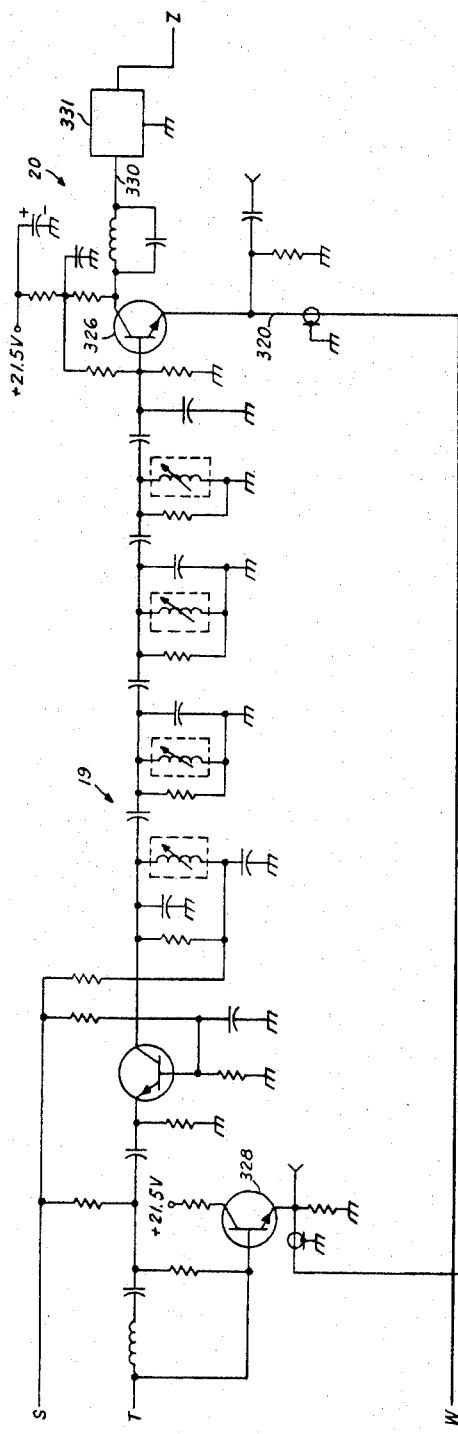
Figure 2D:
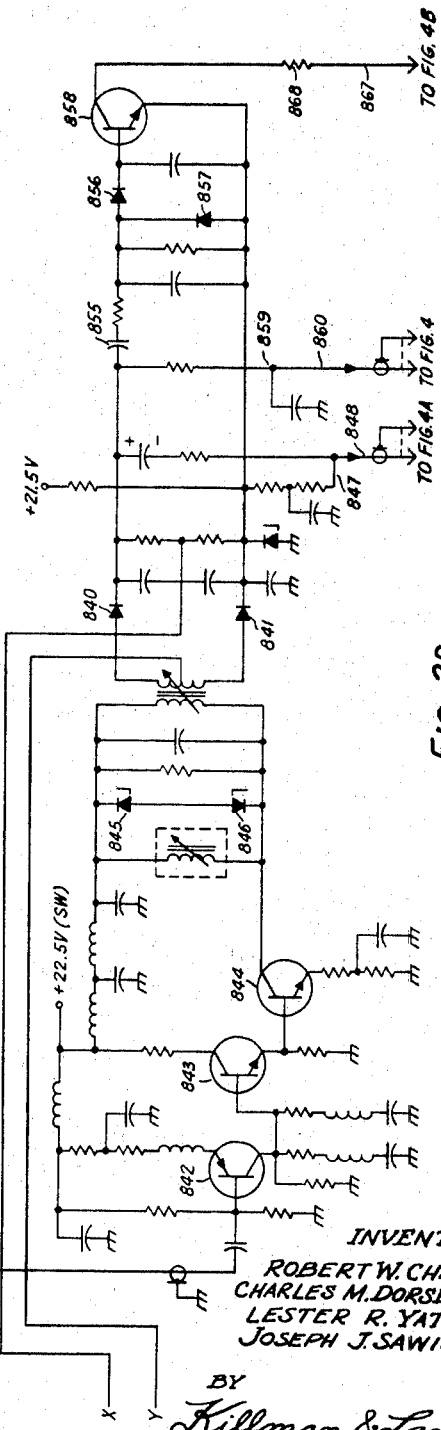
Figure 2E:
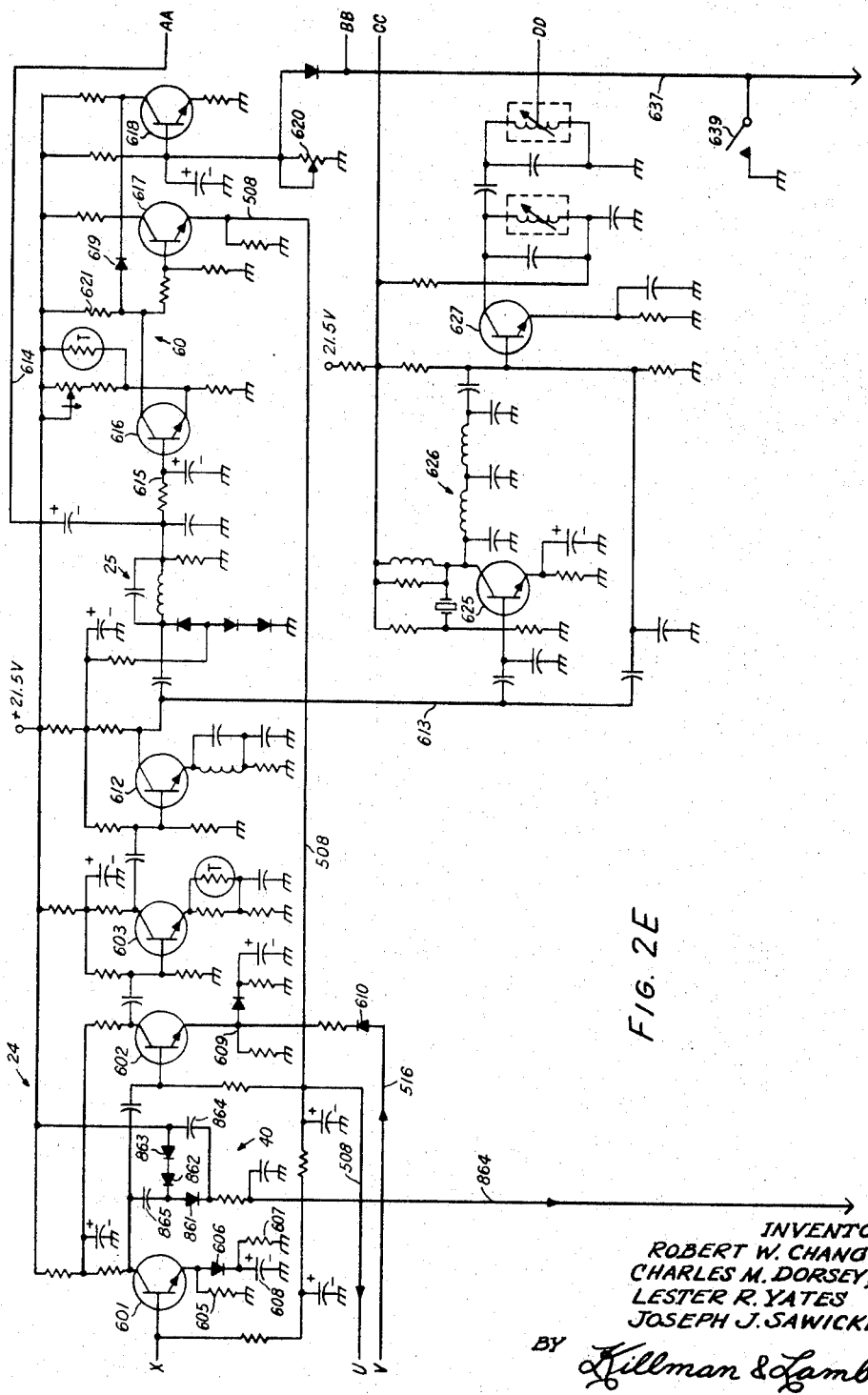
Figure 3:
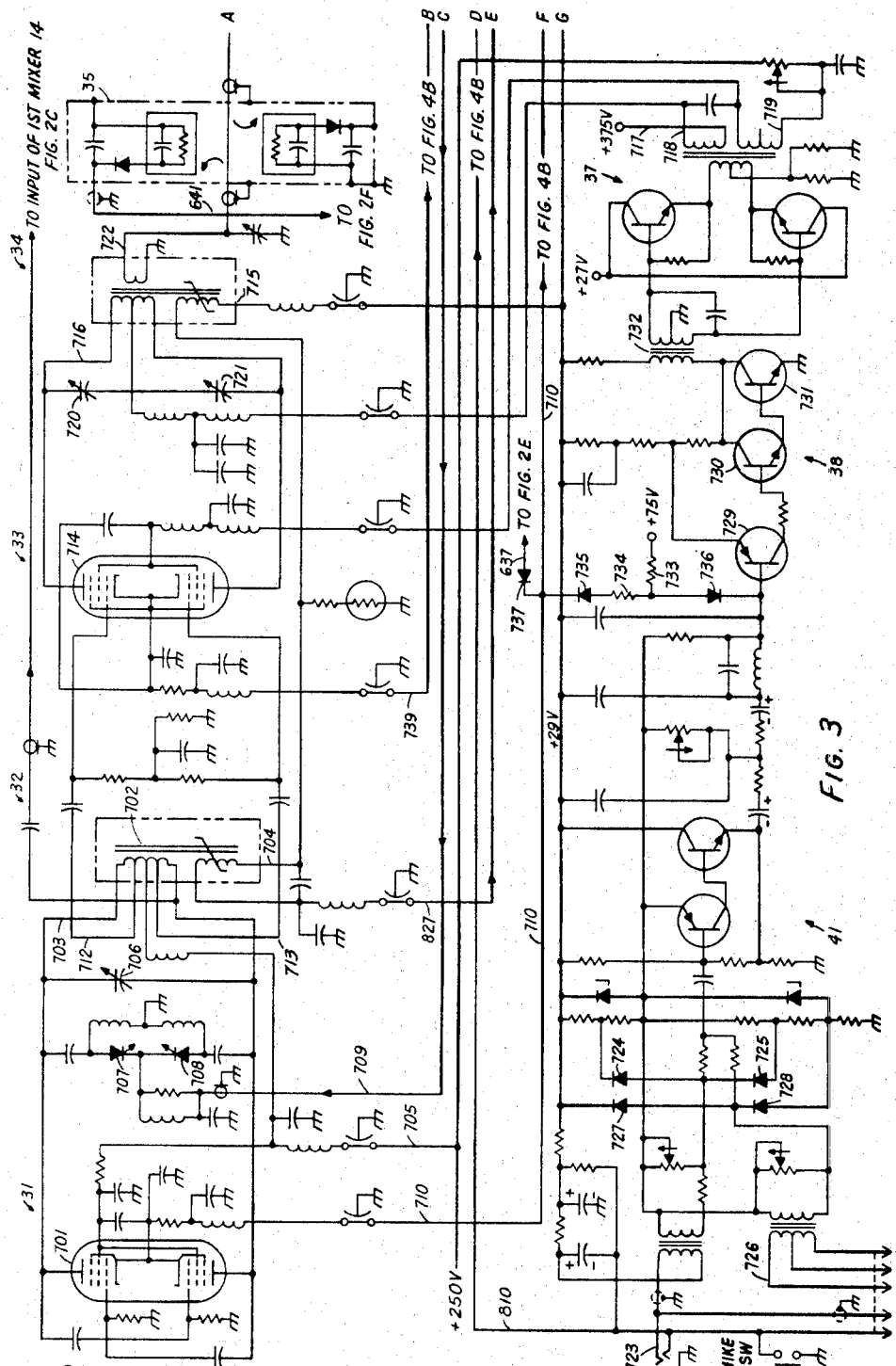
Figure 4B:
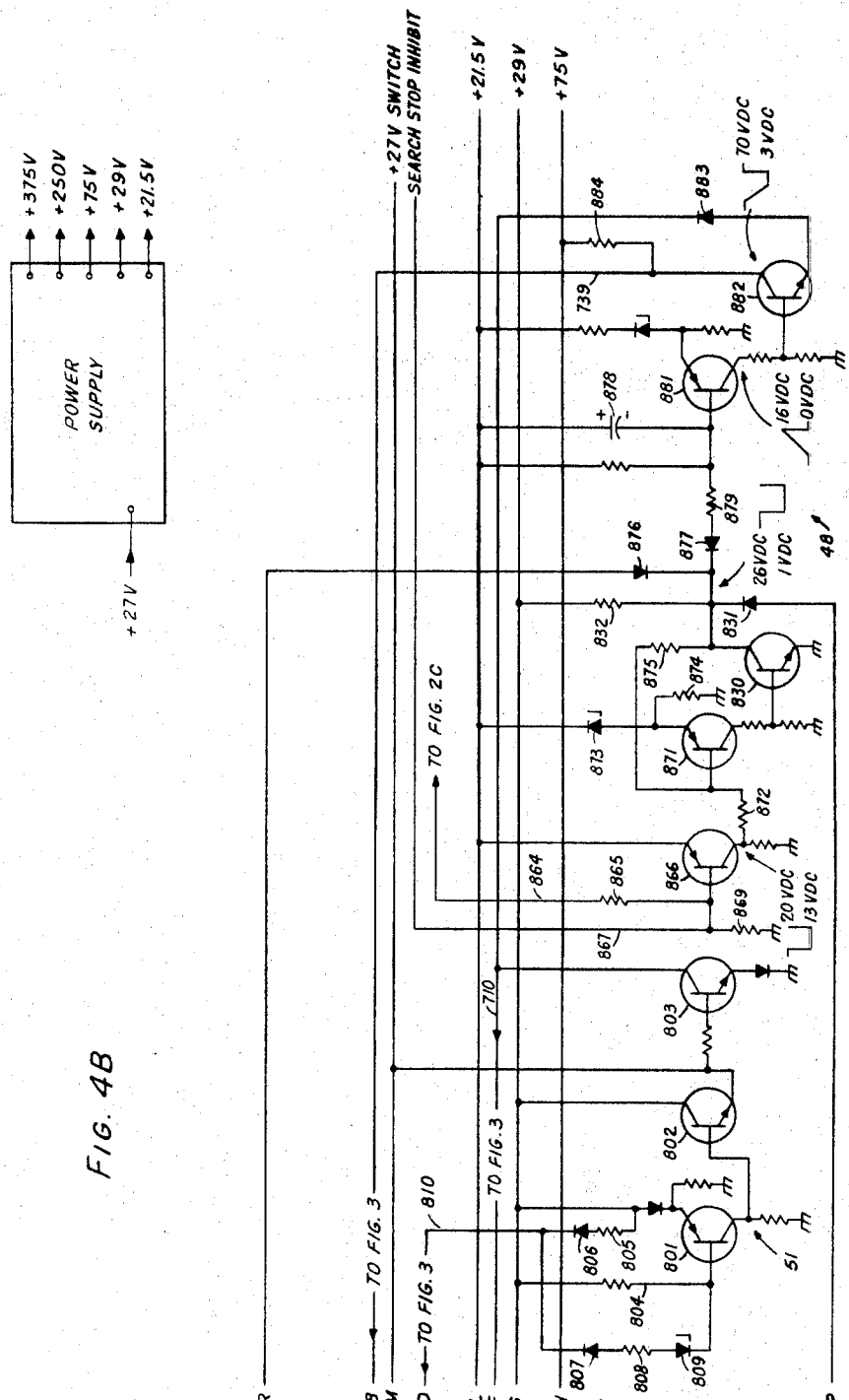

Understanding of the schematic drawings of FIGS. 2 to 4, particularly the means for remote tuning shown therein will be facilitated by reference to the following tables.

TABLE I

|   | 0 | 1 | 2 | 3 | 4 | 5 | 6 | 7 | 8 | 9 |
|---|---|---|---|---|---|---|---|---|---|---|
| A |   |   | x | x |   |   |   |   | x | x |
| B |   | x | x |   | x | x |   |   |   |   |
| C |   |   |   | x | x |   | x | x |   |   |
| D |   |   |   |   |   | x | x |   | x | x |
| E |   | x |   |   |   |   |   | x | x |   | lation of the frequencies of the crystals required for a transceiver covering the band of 118.00–135.95 mc. with 50 kc. channel spacing.

As seen in Table I, various pairs from a set of five wires (A–E) are selected to provide ten unique combinations. If the numeral 1 is to be selected, wires A and B are grounded. If the selected numeral is 2, wires A and C are grounded, and so on. In Table II, connections of the control wire sets for the tens and units digits are shown adjacent the frequency in whole megacycles. For each whole megacycle frequency, a particular tenth megacycle may be selected, and for each tenth megacycle, two choices of hundredths of megacycle frequency are available.

Referring to FIG. 2a, the first local oscillator 15 includes a crystal oscillator 15′ and a frequency doubler 15″. A transistor 101 is loaded by a tapped inductance 102 which is broadly tuned by a varactor 103 to a frequency which is one-half the desired value for the first local oscillator. The precise frequency of oscillation is determined by the resonant frequency of the crystal inserted from the tap of inductor 102 to the emitter electrode of transistor 101. A crystal from a group of cystals 118–135 which are cut for one-half the frequency of the whole megacycle coverage of the receiver is selected for insertion in the circuit of oscillator 15′ by a remote switching control. The crystals are arranged in three banks corresponding to the tens of megacycle frequency range of the receiver. The first crystal bank includes crystals 118 and 119, either of which could be selected upon setting the tens frequency control to 1. Any one of the second bank of crystals 120–129 can be selected upon setting the tens frequency control 2. The third bank of crystals 130–135 comes into operation upon setting the tens frequency control to 3. Each crystal bank is provided with a pair of output lines to which a selected crystal may be connected. The bank output lines ultimately lead back through capacitors 104 and 105 to transistor 101. The output lines for the first bank are 160 and 161, for the second bank 162 and 163 and for the third bank 164 and 165. The crystals for each bank are connected in series. Alternate junction points between the crystals are connected to alternate output lines through switching diodes. The switching diodes for the first bank are 106–108. Crystals in the second bank are connected through switching diodes 136–145 to the output lines 162 and 163. In the third bank crystals are connected to output lines 164 and 165 through switching diodes 146–151.

TABLE II

| Tens | Units | Freq. | 1stXtal | Tenths | 2ndXtal | Hundredths | 3rdXtal |
|------|-------|-------|---------|--------|---------|------------|---------|
| AB | AD | 118 | 51 | BE .0_ | 19.9 | (Open) .00_ | 3.445 |
| AB | AE | 119 | 51.5 | AB .1_ | 20.0 | CD .05_ | 3.395 |
| AC | BE | 120 | 52 | AC .2_ | 20.1 | | |
| AC | AB | 121 | 52.5 | BC .3_ | 20.2 | | |
| AC | AC | 122 | 53 | BD .4_ | 20.3 | | |
| AC | BC | 123 | 53.5 | CD .5_ | 20.4 | | |
| AC | BD | 124 | 54 | CE .6_ | 20.5 | | |
| AC | CD | 125 | 54.5 | DE .7_ | 20.6 | | |
| AC | CE | 126 | 55 | AD .8_ | 20.7 | | |
| AC | DE | 127 | 55.5 | AE .9_ | 20.8 | | |
| AC | AD | 128 | 56 | | | | |
| AC | AE | 129 | 56.5 | | | | |
| BC | BE | 130 | 57 | | | | |
| BC | AB | 131 | 57.5 | | | | |
| BC | AC | 132 | 58 | | | | |
| BC | BC | 133 | 58.5 | | | | |
| BC | BD | 134 | 59 | | | | |
| BC | CD | 135 | 59.5 | | | | |

| Chan. Freq. | 1st L.O. | | 2nd L.O. | | 3rd L.O. | |
|-------------|----------|----------|----------|----------|----------|----------|
|             | Freq. | 1st I.F. | Freq. | 2nd I.F. | Freq. | 3rd I.F. |
| 123.20 | 53.5×2=107 | 16.2 | 20.1 | 3.900 | 3.445 | .455 |
| 133.85 | 58.5×2=117 | 16.85 | 20.7 | 3.850 | 3.395 | .455 |

Table I is the standard ARINC Mark II 2×5 switching code promulgated for airline use. Table II is a tabu- Switching diodes 106–108 and 136–151 are normally nonconductive because of a lack of a return D.C. path through the diodes. A particular crystal from any of the banks is selected by completing the D.C. path through that pair of diodes connected to the end junctions of the crystal. The crystal appearing between the conducting diodes is thus effectively connected to the output lines of the crystal bank.

The control circuits for the switching diodes of the three crystal banks will now be traced. Commencing at line 166, to which positive voltage from a 21.5 v. source is applied, positive voltage is applied to the output lines 160–165 of the crystal banks through resistors 167, 168 and 169. The output lines of each bank are at equal D.C. voltage levels and are isolated from a D.C. path to ground by the choke-capacitor networks 170. The voltage at the anodes of each of the diodes connected to the output lines of a crystal bank will thus be equal and of a value somewhat less than 21.5 volts, depending upon the voltage drop across resistors 167–169. The cathodes for each of the switching diodes 106–108, 136–145, and 146–152 are connected through equal valued resistors 180 to different ones of a set of five control wires A, B, C, D and E in accordance with the code of Table I. Each control wire of the tens megacycle set and the ones megacycle set are returned to a positive voltage bus 182 through comparatively high valued reisstors 183. Bus 182 is connected to the 21.5 v. source. The ends of resistors 183 opposite bus 182 are connected through isolating diodes 184 to leads 171–178. Leads 171–178 are carried through an interconnecting cable (not shown) to a remotely located frequency selector switch (not shown). The frequency selector switch ground pairs of the leads connected thereto in accordance with the switching code of Table I. When any of the leads 171–178 is grounded, the voltage on the control wire A–E connected to the grounded lead through one of the isolating diodes 184 becomes zero, while the voltage on any of the other control wires A–E not grounded remains at +21.5 v. Assume, for example, that 174 is grounded by the remote frequency selector switch, the voltage on control wire A1 becomes zero. Diodes 138 and 145 of the second crystal bank, diode 107 of the first crystal bank and diode 147 of the third crystal bank are now free to conduct by virtue of the completion of the D.C. return path. The voltage at the anodes of all the diodes connected to the output lines of a crystal bank then drops to some value lower than 21.5 v. as determined by the division between resistors 167, 168, and 169 with resistors 180. The voltage at the cathodes of all diodes connected to nongrounded control wires remains at +21.5 v. insuring that those diodes will be reverse biased.

Output from any one of three crystal banks is selected by the tens megacycle frequency selector switch in the following manner. Output lines 160 and 161 of the first crystal bank are connected through diodes 109 and 112, and load resistors 185 and 186 to control wires A10 and B10. Diode 113 connects line 161 directly to control wire C10. Output lines 162 and 163 of the second crystal bank are connected through diodes 114 and 116 through a load resistor 187 and a load impedance 188 to control wires A10 and C10. Diode 115 connects output line 163 directly to control wire B10. Output lines 164 and 165 of the third crystal bank are connected through diodes 154 and 155 through load resistors 186 and 187 to control wires B10 and C10. Diode 153 connects output line 165 directly to control wire A10. Control wires A10, B10 and C10 are connected through resistors 183 to the positive voltage bus 182 and through the isolating diodes 184 to control lines 171, 172 and 173 leading to the remotely located tens megacycle frequency selector. The function of diodes 113, 115 and 153 is to short-circuit their respective crystal banks when the output from their respective bank is not required.

The operation for selecting a crystal from each bank will now be described. First, assume that the frequency of the receiver in whole megacycles is to be 118. The tens megacycle remote selector switch is set to one. Table I shows control wires A and B to be the combination for one and thus the remote frequency selector will cause leads 171 and 172 to be grounded. The voltage on control wires A10 and B10 drops to zero, while that on C10 remains at 21.5 v. With B10 at zero, diode 115 is conductive to short-circuit output on line 163 of the second crystal bnak. Zero voltage on wire A10 likewise causes diode 153 to be conductive short-circuiting output from the third crystal bank. Diode 113 cannot conduct because of the high reverse bias applied from wire C10. The zero voltage on wire A10 and B10 allows conduction from line 166 through resistor 167, diodes 109, 112 and load resistors 185 and 186. Output from crystals of the first bank, present on lines 160 and 161, will thus be developed across load resistors 185 and 186 for application to lines 189 and 190, leading to transistor 101.

Having selected the proper crystal bank for operation, it remains to select a particular one of the crystals in the bank, while holding the rest of the crystals in that bank inoperative. Table I shows that wires A and D are paired as the code for the digit 8. The remote one megacycle frequency selector would therefore cause the grounding of leads 174 and 177. The voltage on control wires A1 and D1 therefore drops to zero, while that on wires B1, C1 and E1 remains at 21.5 v. With wire A1 at zero, diodes 145 and 138 conduct through resistor 168, diode 107 conducts through resistor 167 and diode 147 conducts through resistor 169. With zero voltage on wire D1, diodes 144 and 141 conduct through resistor 168, diode 106 conducts through resistor 167 and diode 150 conducts through resistor 169. In the first crystal bank diodes 106 and 107 are conductive, diodes 138, 141, 144 and 145 are conductive in the second crystal bank, while diodes 147 and 150 are conductive in the third crystal bank. In the first crystal bank diodes 106 and 107 are adjacent and therefore effectively connect crystal 118 across output leads 160 and 161. In the second crystal bank diodes 144 and 145 are adjacent, threfore effectively connecting crystal 128 across output lines 162 and 163. All of the other crystals in all banks are effectively out of circuit with their respective output lines because of the presence of a nonconducting diode in at least one of the circuit lines joining those crystals to their respective output lines. In the first crystal bank, while diode 107 is conductive, diode 108 is not. Thus crystal 119 is effectively out of circuit with lines 160 and 161. In the second crystal bank all of the crystals, with the exception of 128, will be found to be blocked from output lines 162 and 163 by at least one nonconducting diode, and the same is true for the third crystal bank. The one megacycle frequency selector has therefore caused crystal 128 to be connected across output lines 162 and 163 and crystal 118, across lines 160 and 161. The tens megacycle frequency selector has short-circuited output from the second and third crystal banks, as previously described. Therefore crystal 118 alone is effectively connected to lines 189 and 190 to set the frequency of oscillator 15' at 51 megacycles. In like manner, selection of a frequency in the 120–129 megacycle band will cause the short-circuiting of output from the first and third crystal banks and the selection of a single crystal from the second bank while all other crystals of the second bank remain inoperative.

The frequency of oscillator 15' is doubled in stage 15''. It is necessary for the operation of both stages 15' and 15'' that their respective loads be broadly tuned to the selected frequency. Varactors 103 and 103' provide tuning of the stages 15' and 15'', while a third varactor 103'' tunes the input to stage 15''. A direct control voltage is developed on line 192 for application to varactors 103, 103' and 103''. The control voltage is varied in discrete steps according to the frequency selected by means of the tuning logic circuit now to be described.

Tuning logic is provided by a transistor 401, connected as an emitter follower, and a voltage divider including resistor 422 and a plurality of selectable resistors 424–438 which may be alternatively inserted in series with resistor 422 to provide a step variable voltage input to the base of transistor 401. The emitter circuit of transistor 401 includes a voltage divider having a resistor 411 connected in series with selectable resistors 402, 404 and 406. Selection of one of these resistors multiplies the voltage output of transistor 401 by three discrete factors. Voltage from a positive 75 v. source, applied to line 454, is regulated to 39 v. by resistor 417 and Zener diode 453. Resistor 422 is connected to the 39 v. by resistor 417 and Zener diode 453. Resistor 422 is connected to the 39 v. regulated point and through a temperature compensating diode 452 to the base input line 455. The anodes of diodes 440–448 are connected to line 455 with the cathode of each connected to a different value resistor 424, 426 and so forth. The opposite ends of resistors connected to the cathodes of diodes 440–448 are grounded. Diodes 440–448 and 452 are pooled for normal conduction. Without further embellishment of the circuit, the voltage on line 455 would therefore be that resulting from the voltage division of 39 v. by resistor 422 and the parallel resistance of resistors 424, 426, etc. However, it is desired that only one of the resistors 424, 426, etc., be effective to establish the voltage on line 455. The selected resistor is determined by the setting of the units megacycles frequency selector and for that purpose switching diodes 460–477 are connected to leads 174–178 through isolating diodes 459 in a combination determined by the code of Table I. Resistors 423, 425, 427, 431, and 433 are connected from the 75 v. line 454 to the anodes of diodes 460–477 for the purpose of back-biasing all or all but one of the diodes 440–448. The switching diodes 460–477 are poled for conduction from line 454 through bias resistors 423, 425, etc., and voltage dividing resistors 424, 426, etc., to ground. The values of bias resistors 423, 425, etc., are selected so that the voltage developed across any of the voltage dividing resistors 424, 426, etc., by conduction through the bias resistors will always be greater than +39 v., thereby insuring that diodes 440–448 will be reverse biased. This operation can be made plainer by an example. Suppose the units megacycle frequency selector is set at 1. Table I shows lines A1 and B1 to be grounded, and lines 174 and 175 are at ground and the voltage at the anodes of diodes 460 and 461 is zero. Any reverse bias which previously existed at the cathode of diode 440 is removed so that diode 440 conducts to establish the voltage on line 455 as 39 v. multiplied by the ratio of the value of resistor 424 to the sum of the values of resistors 424 and 422. This value is approximately 24 v., assuming diodes 441–448 to be cut off. Diodes 441–448 are, in fact, cut off by the following means. Conduction occurs from line 454 through resistor 427, diode 475 and resistor 437 and diode 476 and resistor 438, thus the voltage at the cathodes of diodes 441–447 and 448 is 75 v. multiplied by the ratio of the parallel resistance of resistors 426, 428, 437, and 438 to the total resistance. This value is approximately 44 v. Conduction also occurs through resistor 431, diodes 465 and 466 and resistors 428 and 432 to ground; and through diodes 471 and 472 and resistors 435 and 436 to ground. These paths form a voltage divider similar to that in which resistor 427 was a part and in which the values of the resistors are so proportioned as to produce a positive voltage of approximately 44 v. at the anodes of diodes 442, 443, 445 and 446. Lead 178 is also ungrounded so that another voltage divider including resistors 433 and the parallel combination of resistors 432, 434 and 438 is formed. The relative value of these resistors is such that again a voltage of approximately +44 v. is applied to the cathodes of diodes 443, 444, and 448. If the logic circuits are traced for all frequency digits it will be found that, with the exception of the digit 9, only one of the diodes 440–448 is conductive at any time and that the value of the single resistance 424, 426, etc., inserted in series with resistor 422 increases progressively with the value of the selected digit. For the digit 9, all of the diodes 440–448 are reverse biased. The voltage on line 455 is then at a maximum of approximately 39 v.

The emitter circuit of transistor 401 includes a voltage dividing arrangement similar to that of the base circuit, controlled by the tens megacycles frequency selector. The emitter is connected through the resistor 411 to line 456 from which logic diodes 457–459 and resistors 402, 404 and 406 are connected to ground. Lines 171–173 are extended through isolating diodes 450 to the junctions of the switching diodes 478–483 with bias resistors 400, 403 and 405 from the 75 v. line 454. Only one of the resistors 402, 404 or 406 will at any time be effectively connected in series with resistor 411 upon grounding a selected pair of leads 171–173 from the tens megacycle frequency selector. The operation of the emitter voltage divider circuit is similar to that of the base voltage divider circuit and is readily traceable by reference to the code of Table I. With the selection of the digit 1 on the tens megacycles frequency selector, a voltage divider formed by resistors 411 and 402 multiples the output of transistor 401 by a factor of approximately 0.16. Selection of the digit 2 places resistor 404 in circuit with resistor 411, while disabling resistors 402 and 406. The transistor output multiplication factor is then increased to approximately 0.29. Selection of the digit 3 places resistor 406 in circuit and increases the transistor output multiplication factor to approximately 0.5. There is thus developed on line 192 a unique value of control voltage for each position of the whole megacycle selector. This control voltage determines the capacity of varactors 103, 103″ and 103′ for tuning the oscillator and doubler circuits to the selected whole megacycle frequency.

The output of the first local oscillator, taken from the tank circuit of doubler 15″, appears on line 193 which connects the first mixer 14 in FIG. 2C, to which reference will now be made. The control voltage on line 192 tunes the input and output circuits of R.F. amplifier 13 by adjustment of the capacities of varactors 501–504. Signal from a distant station is applied by way of the antenna and antenna relay to line 505 connected to the double-tuned input circuit of amplifier 13. The sample signal from the master oscillator 31 appears on line 506 which is connected to the double-tuned output circuit of amplifier 13. The master oscillator operates only during the transmit mode so there is no confusion between signals developed in the output circuit of amplifier 13 and applied to the first mixer 14. In amplifier 13, the emitter of transistor 513 is returned to ground through a biasing resistor 507. Forward bias is applied to the base of transistor 513 from an AVC line 508. The voltage on line 508 for normal reception is in the vicinity of 4 v. positive. Amplifier 13 is cut off during transmission by application of +27.5 v. from a switched voltage source, later to be described, to point 509. This voltage is reduced approximately 5 v. in the drop across the Zener diode 510, and conducted through an isolating diode 511 and filter network 512 for application to the emitter of transistor of 513. At that point the volage is of the order of 8 v. positive, sufficient to reverse bias transistor 513 and, after a small drop through isolating diode 514, sufficient to drive a Zener diode 515, connected between AVC line 508 and ground, into conduction. The voltage on line 508 is then stabilized at the Zener voltage of diode 515, which is approximately 5 v. positive. This later value is higher than any normal AVC voltage occurring during reception. The higher value guarantees that during transmission the I.F. stages controlled by the AVC voltage will be set at maximum gain for processing the master oscillator frequency sample signal. The voltage at the junction of diodes 510 and 511 is also available on line 516 for disabling the output of I.F. amplifier 24 to prevent entry of transmitted signals from that source into the audio circuits 25–28.

Signal from the first local oscillator 15 is fed by line 193 to the emitter of transistor 520 in the first mixer 14. Either the master oscillator frequency sample signal or the amplified received signal is applied to the base of transistor 520 by the output circuit of R.F. amplifier 13.

The output of mixer 14 is at the first intermediate frequency.

As may be seen from Table II, the first intermediate frequency falls within the band of 16.000 mc. to 16.950 mc. The first I.F. amplifier 16, which includes transistor 522 and fixed tuned input and output circuits 523, 524, is sufficiently broad banded to satisfactorily amplify any of the first intermediate frequency signals.

Although the frequency difference between the whole megacycle frequency of any channel and the frequency of the first local oscillator is constant at 16.000 mc., each of the whole megacycle frequencies are further divided into twenty channels determined by selection of one of ten values for the tenths megacycle frequency selector and one of two values for the hundredths megacycle frequency selector. The first I.F. frequency may therefore be as small as 16.000 mc. or as large as 16.950 mc. when, for example, the frequency selector in the first instance is set at 118.000 mc. and in the second instance is set at 118.950 mc. The twenty channels separating each of the whole megacycle frequencies are selected by control of the frequencies of the second and third oscillators 18 and 21.

Oscillator 18 includes a transistor 200, ten crystals 201–210, varying from 19.9 to 20.8 mc. in 0.1 mc. steps, and five control wires 211–215 leading to the remote tenths megacycle frequency selector switch. Wires 211–215 are grounded in selected pairs according to the code of Table I for forward biasing adjacent pairs of switching diodes 216–225. This process selects a particular one of crystals 201–210 to be in circuit with transistor 200 identically to the manner of selection of crystals for oscillator 15'. Further description of the circuit is unnecessarily repetitious.

Upon selection of a particular value for the tenths megacycle control, oscillator 18 operates at the frequency indicated in Table II to provide a signal on line 230 beating with the first I.F. signal in the second mixer 17.

Mixing in stage 17 is accomplished by injecting the first I.F. signal into the base of a transistor 525, while applying the output of oscillator 18 to the emitter. The second I.F. signal produced at the collector of transistor of 525 is at either of the two values 3.850 or 3.900 mc. it is necessary to further heterodyne the second I.F. signal for the selection of one of the two remaining choices of operating frequency. This is accomplished through control of the frequency of the third oscillator 21, which is but an abbreviated version of the second oscillator 18, affording a choice of one of two operating frequencies.

Oscillator 21 includes a transistor 301 and two crystals 304, 305, either of which may be placed in circuit with transistor 301 upon the selection of the value .00 or .05 for the hundredths megacycle frequency control. The frequency of crystal 304 is 3.395 mc., which beating with the lower value second I.F. produces a third I.F. of 455 kc. The frequency of crystal 305 is 3.445 mc. which combined with the higher second I.F. signal produces the third I.F. at 455 kc. One of the electrodes of each of crystals 304 and 305 is connected to the emitter of transistor 301. The other electrode of each crystal is connected through a switching diode 306, 307 for feedback to the collector of transistor 301. The higher value second I.F. of 3.900 mc. is present for the lower value .00 mc. frequency channel and the lower value 3.850 mc. second I.F. is present with the .05 mc. frequency channel. The hundredths megacycle frequency selector provides open circuit for the .00 mc. channel, and grounds control wires 308 and 309 for the .05 mc. frequency channel. The anode of diode 306 and the cathode of diode 307 are connected to a grounded resistor 311, the upper end of which is connected to a 21.5 v. source through resistors 312 and 313. Feedback to the collector of transistor 301 is provided from the upper end of resistor 311. The anode of diode 307 is normally forward biased through resistors 314 and 315 connected to the 21.5 v. source. At the same time the cathode of diode 306 is reverse biased by resistor 316 connected from the junction of resistors 314 and 315 to the cathode. Upon selection of the .05 mc. channel, wires 308 and 309 are grounded thereby dropping the potential at the lower end of resistor 314 nearly to zero and likewise that of the anode of diode 307 and the cathode of diode 306. Diode 306 then becomes forward biased, while diode 307 is reverse biased. Crystal 304 then comes into operation and crystal 305 drops out, causing the frequency of oscillator 21 to become 3.395 mc.

The output of oscillator 21 is carried by wire 320 to the emitter of a transistor 326 in the third mixer 20. The output of second mixer 17 follows two paths, one of which is through an anode follower 328 to the phase lock detector 43, later to be described, while the other is through the second I.F. amplifier 19 to the base of transistor 326. The third mixer 20 produces a 455 kc. output at the collector of transistor 326 which is carried by wire 330 to the third I.F. amplifier 24 in FIG. 2E, to which reference is now made.

Signal on wire 330 is passed through a bandpass filter 331, centered at 455 kc., to the first transistor 601 in a triple stage R.C. coupled amplifier constituting the third I.F. amplifier 24. The circuits of FIG. 2e will first be considered for the receiving mode of operation. Discussion of their operation during transmission will appear further on. In the first stage of amplifier 24 the emitter of transistor 601 is returned to ground through a resistor 605 which is shunted by the combination of a diode 606, resistor 607 and a capacitor 608. The purpose of the network is to provide more rapid automatic gain control action in amplifier 24 than that produced by AVC on line 508. At low signal levels capacitor 608 effectively bypasses resistor 605 and produces high signal gain in transistor 601. As the signal level increases, diode 606 tends to rectify a greater portion of signal which stored in capacitor 608 reduces the conduction cycle of diode 606 and effectively removes the bypass around resistor 605. This causes greater signal degeneration in resistor 605 and consequent reduction of signal gain in transistor 601. A detector circuit 40 connected to the collector of transistor 601 functions during the tuning cycle of the transmit mode. This function will be described later on.

The second stage of amplifier 24 includes a transistor 602 with a gain stabilizing network 609 in the emitter and a connection through an isolating diode to line 516 from FIG. 2B. In the transmit mode a positive voltage of approximately 20 v. appears on line 516, which is sufficient to cut off transistor 602 and prevent output from transistor 603, the final stage of amplifier 24. Output of amplifier 24 is further amplified in a transistor 612, whence it is applied to a detector circuit 25 and, by way of line 613, to the audio squelch control circuit 29. The detected audio signal is applied by line 614 to the audio premaplifier 26 and through a filter network 615 to an AVC amplifier 60.

AVC amplifier 60 includes two direct coupled transistors 616 and 617 and a gain control transistor 618. The base circuit of transistor 617 is coupled to the collector circuit of transistor 618 through a diode 619. The base of transistor 618 is returned to ground through a sensitivity control resistor 620. Transistor 618 operates at a fixed level determined by the setting of resistor 620. For the lowest value of resistance 620, the voltage at the base of transistors 618 will be zero, thus causing the transistor to be cut off and the voltage at its collector to be equal to the supply voltage. Diode 619 is consequently reverse biased. Absent a signal in transistor 616 current flow through resistor 621 is at a minimum. Consequently base voltage of transistor 617 is at its highest value and the emitter output voltage on line 508 is at a maximum value producing maximum gain in all controlled amplifiers. Appearance of signal in transistor 616 increases the voltage drop through resistor 621 and results in a lower base vlotage on transistor 617. The emitter voltage output on line 508 is then of a lower value causing the gain of the controlled amplifiers to be reduced in the desired AVC action.

Sensitivity control is effected by adjustment of resistor 620 upwardly for various levels of conduction in transistor 618. This causes the voltage at the collector of transistor 618 to be reduced from the cut off value and causes conduction in diode 619. The collector voltage of transistor 618 then dominates the voltage applied through resistor 621, causing the base voltage of transistor 617 to be reduced. This results in a lower voltage level on line 508 and reduced gain in all controlled amplifiers. The appearance of signal from transistor 616 further reduces the voltage on line 508 in the normal AVC action.

Signal from preamplifier 26 is passed through a speech filter 622 to a series limiter 623. A connection is made from the 27.5 v. switched source through an isolating diode 624 to the output of limiter 623. In the transmit mode a positive voltage will appear from this source of sufficient magnitude to reverse bias the final diode in limiter 623 and thereby prevent output from preamplifier 26 reaching the audio amplifier 28. Amplifier 28 performs its expected function during reception and during transmission amplifies the sidetone signal taken from the directional coupler 35. This method of supplying sidetone during transmission provides assurance that an outgoing R.F. signal is being generated. The squelch circuit 29 maintains audio amplifier 28 in an off position until a signal is received. For sidetone amplification during transmission, the squelch is disabled in the manner later to be described. Attention is now directed to the squelch circuit 29.

It will be recalled that during transmission the final stages of third I.F. amplifier 24 are cut off. Therefore, only during reception can a 455 kc. signal appear on line 613. The 455 kc. signal on line 613 is applied to a crystal controlled converter 625 which oscillates at a frequency of 636 kc. and mixes with the incoming 445 kc. signal to produce a difference frequency signal at 181 kc. A filter 626 connected to the output of converter 625 passes the 181 kc. signal and rejects the converter self-oscillations of 636 kc. The 181 kc. signal and the 455 kc. signal from line 613 are added in a mixer 627 to produce a 636 kc. sum signal. It should be especially noted that the 636 kc. output from mixer 627 can exist only when a 455 kc. signal is present on line 613. The output of mixer 627 is sharply filtered and passed to a second converter 628 which oscillates at a crystal controlled frequency of 634 kc. to produce a 2 kc. difference frequency. The 2 kc. difference signal is detected in a diode 629 and applied to control a switching transistor 630. Transistor 630 is biased into saturation by a network 631 which includes a potentiometer for adjusting the threshold of the squelch circuit. Upon the appearance of a 2 kc. output from converter 628 of a magnitude determined by the threshold setting, the positive bias applied to the base of transistor 630 will be reduced sufficiently to cut off that transistor. The collector of transistor 630 is supplied by way of the output transformer 632, feedback resistor 633, base resistor 634 and isolating diode 635 in the audio amplifier 28. When transistor 630 is saturated in the squelch condition a substantial voltage drop is developed across resistor 634. This reduces the base bias of transistor 636 below the voltage applied to its emitter and cuts that transistor off. When signal appears on line 613, transistor 630 is cut off. The base voltage of transistor 636 then rises to a point permitting conduction and amplifier 28 operates in a normal manner.

A control line 637 leads to the tune-enable circuit 51. During the receive mode, this line is open. For transmission the line is effectively grounded which causes the voltage at the base of the transistor 630 to drop very nearly to zero and cuts off the transistor. The squelch may also be disabled for test purposes by grounding wire 637 through a switch 639. For sidetone amplification during transmission input to audio amplifier 28 is supplied by wire 641 connected to the directional coupler 35. A connection by wire 642 from the high side of the primary of output transformer 632 to biasing network 631 tends to reduce the positive bias applied to the base of transistor 630 upon appearance of output signal from amplifier 28. The purpose is to lower the output required of detector 629 to maintain transistor 630 cut off, once the circuit has become unsquelched, and thus prevent momentary dropouts of weak signals fluctuating about the threshold level. A resistor 643 and diode 644 connected from the positive voltage source of amplifier 28 to the collector of transistor 630 maintains the collector voltage at a high positive value whenever the transistor is cut off. This reduces the time required for transistor 630 to switch from a nonconducting to a fully conducting state.

The transmitter circuits will now be described with reference to FIG. 3, following which is a detailed description of the tune-enable and transmit-enable circuits which permit the receiver to function as a frequency control for the transmitter. The master oscillator 31 comprises a duel pentode 701 connected as a push-pull oscillator in which the current variable inductor 32 constitutes the principal tuning element. The current variable inductor 32 is a saturable reactor with a ferrite core 702, a multi-tapped R.F. winding 703, and a control winding 704. Plate and screen power is supplied to 701 from a 250 v. D.C. source connected to line 705. R.F. winding 703 is tuned by a capacitive branch which includes a capacitor 706 and shunt varactors 707, 708. An alternating control voltage is supplied to varactors 707, 708 by line 709 from the phase lock detector 43. This voltage is operative to bring the master oscillator 31 under full frequency control as correct tuning is approached by causing frequency modulation of the master oscillator signal. The operation will be described more fully later on. Cathode bias for tube 701 is supplied on line 710 from a controlled voltage source. During reception the output of this source is maintained at 75 v. positive, thereby maintaining tube 701 cut off. For transmission, the voltage is very nearly zero which is the normal operating bias for tube 701. Oppositely phased output signals from master oscillator 31 appear at taps 712 and 713 whence they are applied to the grids of a dual pentode 714 in the push-pull connected power amplifier 33. The power amplifier 33 includes the second current variable inductor 34 which is similar to inductor 32, except for power handling ability. A control winding 715 adjusts the magnetization of the core of inductor 34 and hence controls the inductance of a center-tapped R.F. winding 716 thereon. The plate supply for tube 714 is from a 375 v. positive source on line 717, through a secondary winding 718 on the output transformer of modulator 37, to the center tap on winding 716 of inductor 34. The screen supply for tube 714 is from the 250 v. source on line 705 through secondary 719 of the modulator transformer to the screens of the tube. The plates and screens of tube 714 are thus simultaneously modulated. Winding 716 is resonated by adjustable capacitors 720, 721. Otuput from power amplifier 33 is supplied to the directional coupler 35 by a secondary winding 722 on inductor 34.

Speech input to the transmitter is from a microphone (not shown) to jack 723, thence through a clipper circuit which includes diodes 724 and 725 to the speech preamplifier 41. An alternative input to speech preamplifier 41 for telemetering altitude or position data is provided through transformer 726 and clipper diodes 727 and 728. The output of preamplifier 41 is further amplified in the driver circuit 38 which includes transistors 729, 730, and 731, the latter of which is coupled through transformer 732 to the push-pull modulator 37. Bias for the base of transistor 729 is supplied through a network which includes resistors 733, 734 and diode 735 connected from the +75 v. source to line 710. The base of transistor 729 is connected through an isolating diode 736 to the junction of resistors 733 and 734. During reception, line 710 is returned to ground through the very high impedance of a cut off transistor in the tune-enable circuit, later to be described. For transmission, this transistor is caused to saturate, thereby reducing the potential on line 710 very nearly to zero and causing substantial voltage drop through resistors 733 and 734. This reduces the voltage at the base of transistor 729 from very nearly the 75 v. level to approximately 15 v. which is sufficiently lower than the positive voltage applied to the emitter of transistor 729 to provide forward bias. Reduction of the potential on line 710 to very nearly zero therefore brings the master oscillator 31 into operation, as previously mentioned, and enables the driver 38 to stimulate modulator 37. No static forward bias is applied to the transistors of modulator 37, hence in the absence of signal from transformer 732 the modulator remains inactive. An isolating diode 737 couples the potential on line 710 to line 637 of FIG. 2E. The low potential on these lines during transmission disables squelch circuit 29, as previously described, to permit amplification of the sidetone. The modulated output of power amplifier 33 passes through directional coupler 35 which detects a small portion of the outgoing power and conducts the same by line 641 to audio amplifier 28 of FIG. 2C for sidetone. The bulk of the outgoing power passes through filter 36 to the arm 738 of antenna relay 12, shown in the receive position, thence to the antenna 10.

Bias for the cathodes of tube 714 is supplied on line 739 connected through a dropping resistor to the 75 v. source. The dropping resistor is shunted to ground by a transistor which is cut off during reception, thereby causing the voltage on line 739 to be very nearly 75 v. positive. This high positive value causes tube 714 to be cut off. For transmission, the transistor is caused to saturate, causing a large voltage drop through the resistor and reducing the voltage on line 739 to approximately 3 v. positive. The power amplifier 33 then becomes fully operative. The location of the dropping resistor and shunt transistor will be pointed out later on.

Figure 5:
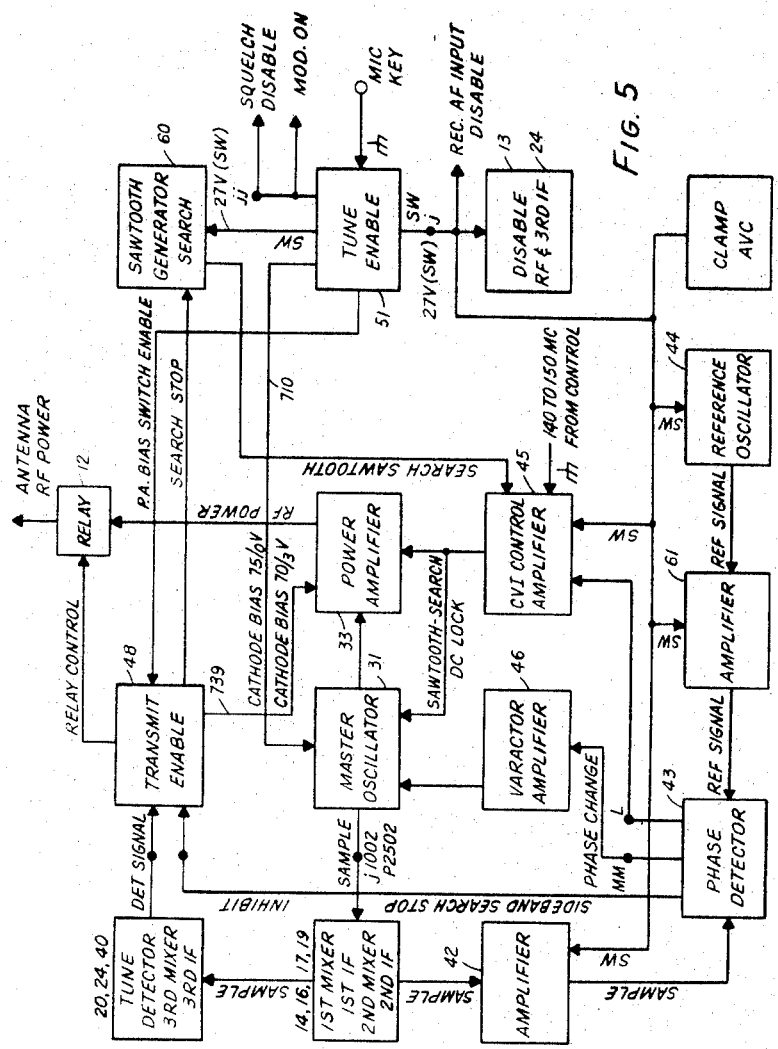
FIG. 5 is a functional block diagram of the tune-enable and transmit-enable circuits of the invention.

Before commencing the detailed description of the circuits which enable the receiver to operate as a frequency control for the transmitter, the operation of these circuits will be reviewed with reference to the block diagram of FIG. 5. The changeover from reception to transmission commences with depression of the microphone key which immediately actuates the tune-enable circuit 51. The tune-enable circuit then supplies power to all switch 27 v. points. This causes the reference oscillator 44 and its output amplifier 61, together with amplifier 42 to operate. It disables the R.F. amplifier 13 and the third I.F. amplifier 24. It clamps the AVC voltage at a value producing maximum gain through the first I.F. amplifier 16 and the second I.F. amplifier 19. It also initiates a search generator 47 which commences to produce a sawtooth waveform output.

The tune-enable circuit 51 also causes the cathode bias on line 710 to master oscillator 31 to be reduced from a 75 v. positive value to zero, while another portion of the circuit supplies an enabling signal to the transmit-enable circuit 48 which will allow the cathode bias of power amplifier 33 to be reduced but does not yet cause that event.

The master oscillator 31 now supplies signal to the first mixer 14. Almost certainly, the master oscillator will be off frequency, hence no signal as yet will pass through to the second I.F. amplifier output. The search generator 47, however, applies a sweep voltage to the control amplifier 45, which varies the inductance of the current variable inductor in master oscillator 31, causing the frequency to increase linearly with time. Shortly the increasing frequency of master oscillator 31 will reach such value that the difference between it and the frequency of the first local oscillator falls within the passband of the first and second I.F. amplifiers. This output then passes through amplifier 42 to phase detector 43 where, upon comparison with the output of reference oscillator 44, it will be manifest as an A.C. output due to the frequency difference between the two. The output of amplifier 46 is applied to varactors in the tuned circuit of master oscillator 31 to cause rapid frequency modulation of the oscillator. This variation in oscillator frequency causes the oscillator to move more promptly to the pull-in range of the phase lock loop which includes phase detector 43, amplifier 45 and the current variable inductor of master oscillator 31. The A.C. output of phase detector 43 which occurs as phase lock is approached, is rectified and supplied to the transmit-enable circuit 48 as an inhibit signal. The output of the tuning detector 40, supplied from the first stage of the third I.F. amplifier 24, tends to actuate transmit-enable circuit 48, but cannot do so until the disappearance of the inhibit signal from phase detector 43. The inhibit signal from phase detector 43 dissappears when the frequency of the master oscillator approaches sufficiently close to the frequency of the reference oscillator to fall within the pull-in range of the phase lock loop. At this time the output of phase detector 43 becomes direct current. Master oscillator is then no longer frequency modulated by output from the phase detector and the inhibit signal disappears from the transmit-enable circuit. The purpose of applying the inhibit signal to the transmit enable circuit 48 is to prevent premature interruption of output from search generator 47 and consequent operation of master oscillator 31 in the near fringes of the pull-in range of the phase lock loop.

Upon actuation of the transmit-enable circuit 48, output from the search generator 47 is stopped, antenna relay 12 switches the antenna from the receiver input circuit to the transmitter output circuit, and the cathode bias on power amplifier 33 is caused to drop from 70 v. positive to 3 v. positive, thereby permitting the flow of full carrier power to the antenna.

The circuits of FIG. 5 are detailed in the schematic diagrams to which reference will now be made and particularly to FIG. 4 thereof. The tune-enable circuit 51 includes three transistors 801, 802 and 803. These transistors are cut off in the receive mode. Upon switching to the transmit mode by closing the remotely located microphone key, transistor 801 is caused to conduct and transistors 802 and 803 become in turn conductive. Transistor 802 is the source of switched 27 v. and transistor 803 is the bias control for master oscillator 31. The emitter of transistor 801 is connected to the +29 v. source and the base is returned to the same source through resistor 804, thus normally biasing the transistor nonconductive. A control network consisting of resistor 805, diode 806, diode 807, resistor 808 and Zener diode 809 is connected from the 29 v. bus to the base of transistor 801. Diode 807 is poled for nonconduction so that normally no voltage will be applied by the control network to the base of transistor 801. The junction point of diodes 806 and 807 is connected through a control wire 810 to the remotely located microphone switch. Closing this switch grounds the junction point so that current can then flow through resistor 804, Zener diode 809, etc., to ground, thereby establishing the base voltage of transistor 801 as 10 v., the Zener value of diode 809. Transistor 801 becomes forward biased to the point of saturation, raising the collector voltage very nearly to the 29 v. level and heavily forward biasing transistor 802. Transistor 802 is connected as an emitter follower in which the combined impedance of all circuits drawing power from the switched 27 v. source serves as the load. All circuits controlled by the switched 27 v. source now become operative, including transistor 803 which is heavily forward biased. The collector of transistor 803 is connected to line 710, leading to the cathodes of master oscillator 31 and the network comprising resistors 733, 734 and diode 735 in FIG. 3. The emitter of transistor 803 is connected to ground through the low impedance of a diode 811. When transistor 803 is cut off, very little current can flow in line 710, consequently the voltage on line 710 is established through resistors 733, 734 and diode 735 at approximately 70 v. positive. When transistor 803 saturates, the voltage on line 710 drops very nearly to zero and hence, renders the master oscillator 31 and modulator 38 of FIG. 3 operative.

With master oscillator 31 and all circuits controlled by the switched 27 v. source in operation, the next function is to sweep the frequency of the master oscillator to bring it within the control range of the phase lock loop. The sweep generator 60 includes a transistor 813, a unijunction transistor 814, and a charging capacitor 815. Capacitor 815 is charged from a network comprised by resistor 816, diode 817, diode 818 and resistor 819 connected from the +40 v. bus to the switched 27 v. line. During the receive mode the voltage on the switched 27 v. line is zero. Therefore, capacitor 815 is initially charged to a value determined substantially by the ratio of the value of resistor 819 to the total resistance of the charging network connected to the 40 v. source. This voltage is approximately 4 v. positive. Upon conduction of transistor 802, resistor 819 is no longer effectively grounded and diode 818 is for a time reverse biased. Capacitor 815 then commences charging towards the 40 v. level through resistor 816 and diode 817. The voltage at the base of transistor 813 increases linearly. Shortly it will have risen to a value sufficient to forward bias transistor 813, which is normally reverse biased by the voltage divider 820 connected from the 40 v. source to the emitter. The collector load of transistor 813 is a portion of the input circuit of amplifier 45 which is referenced to the 40 v. source. The waveform at the collector of transistor 813 during sweep therefore remains at a constant value during the time required for capacitor 815 to charge to a level forward biasing the transistor, thereafter it declines linearly as the collector current follows the increasing base voltage from capacitor 815.

The main loop amplifier 45 includes the five transistors 821–825 in a direct connected circuit of conventional design. Input to the base of transistor 821 is from the phase detector 43, shown in detail in FIG. 2D. The collector of transistors 813 is connected to the collector of transistor 821 to share the common load resistor 826, which is returned to the +40 v. bus. Thus both the output of phase detector 43, amplified by transistor 821, and the sweep output of transistor 813 are applied to the base of transistor 822. The polarity of the output of the waveform of transistor 813 is preserved by the emitter follower connection of transistor 822 and inverted in the common emitter configuration of transistor 823. The output voltage at the emitter of transistor 824 is of a linearly increasing waveform. The collector current of transistor 825 possesses the same wave shape so that the current in the control windings of the master oscillator and power amplifier inductors increases linearly with time, causing the inductance to decrease and the frequency of oscillation to increase, all as the charge continues to accumulate in capacitor 815. The connection of the collector of transistor 825 is through wire 827 to control winding 704 of inductor 702 in FIG. 3, thence through control windings 715 of inductor 34 to the +29 v. source.

It is expected that the rising charge on capacitor 815 will sweep the frequency of the master oscillator within the pull-in range of the phase lock loop. When this occurs the transmit-enable circuit 48 is actuated and one transistor 830 therein is caused to conduct heavily. This removes reverse bias applied to a diode 831 through resistor 832 and drops the voltage at the junction of resistor 816 and diode 817 very nearly to zero. The source of charging voltage for capacitor 815 no longer increases, but leaks gradually off through the emitter circuit of transistor 813. The phase lock loop however maintains control of the master oscillator frequency so that the decline of sweep voltage is of no consequence.

If phase lock should fail to occur, the voltage on the capacitor 815 continues to increase until the master oscillator frequency is swept through the entire operating band. When the voltage on capacitor 815 reaches this upper level, unijunction transistor 814 triggers and dumps the charge of capacitor 815, causing the sweep cycle to be repeated.

Referring to FIG. 2C, the reference oscillator 44 includes transistor 833 in a crystal controlled oscillator circuit and transistor 834 connected as an amplifier. Both transistors 833 and 834 are powered from the switched 27 v. source and hence operate only during transmission. The crystals 835 and 836 have a frequency equal to the second I.F. frequency, either 3.850 mc. or 3.900 mc., and are selected by the hundredths megacycle frequency selector simultaneously with the selection of crystals 304 or 305 for the third local oscillator 21. Diodes 837 and 838 are biased in an identical manner with diodes 306 and 307. Consequently, with control wire 308 ungrounded for the .00 mc. frequency channel, diode 838 is conductive and diode 837 is cut off. Crystal 836 is in circuit establishing a frequency of oscillator 44 at 3.900 mc. When control wire 308 is grounded for selection of a .05 mc. frequency channel, diode 837 becomes forward biased and diode 838 is reverse biased, thus substituting crystal 835 for crystal 836 and changing the frequency of oscillator 44 to 3.850 mc. The output of oscillator 44, amplified by transistor 834, is applied as a gating signal to two diodes 840 and 841 in a conventional phase detector circuit 43. The second mixer signal taken from emitter-follower 328 ahead of the narrow band restrictions imposed by the tuned circuits of second I.F. amplifier 19, is further amplified in transistors 842–844 and symmetrically limited by Zener diodes 845, 846, then supplied as signal input to phase detector 43. The output of phase detector 43 is an A.C. signal so long as there is a difference in frequency, rather than a difference in phase, between the master oscillator signal and the selected operating frequency. The A.C. output of detector 43 is coupled by a resistance-capacitance network 847, which attenuates higher frequencies, to wire 848 leading to the input of the auxiliary amplifier 46.

Referring to FIG. 4, the auxiliary loop amplifier 46 includes transistors 849–851 in a conventional three-stage amplifying circuit, the output of which is coupled by capacitor 852 to wire 709. Resistors 853 and 854 apply a positive D.C. bias to wire 709. Wire 709 will be found in FIG. 3 leading to the cathodes of varactors 707 and 708 in the tank circuit of master oscillator 31. The D.C. bias on wire 709 determines the fixed capacity of varactors 707 and 708, while the A.C. component coupled through capacitor 852 introduces a variation in capacity which causes frequency modulation of the output of master oscillator 31. The frequency modulation of master oscillator 31, which does not occur until the sweep voltage has already raised the master oscillator frequency approximately to the selected operating value, causes the master oscillator frequency to vary about the selected operating frequency. This insures that the master oscillator frequency will equal the selected operating frequency a number of times as the master oscillator frequency approaches the selected operating frequency. If frequency modulation were omitted, the master oscillator frequency would equal the selected operating frequency only once during a brief interval. Frequency modulation therefore increases the probability of phase lock during a single sweep cycle.

Again referring to FIG. 2D, the output of phase detector 43 is coupled by a D.C. blocking capacitor 855 to a detector including diodes 856 and 857. The latter detector conductively biases transistor 858 as long as an A.C. component is present in the output of phase detector 43. The purpose of transistor 858 is to prevent stopping the sweep generator 60 at a value which produces a difference in frequency between the master oscillator and the selected operating frequency, yet sufficiently close thereto to provide signal through the tuning detector 40 of FIGS. 1 and 5. Further reference to transistor 858 will be made. Output of phase detector 43 for the main loop amplifier 45 is taken through the low pass R.C. combination 859 by line 860 which leads to the base of transistor 821 in FIG. 4.

Referring briefly to FIG. 2E, the tuning detector 40 connected in the first stage of the third I.F. amplifier 24, includes diodes 861–863 and capacitors 864, 865. A connection from the +21.5 v. bus to the anode of diode 863 maintains the voltage on the detector output line 864 at a positive voltage of approximately 20 v. in the absence of output from transistor 601. Output from transistor 601 adds to the 20 v. value to cause an increase in the voltage on line 864.

Returning to FIG. 4, the output of tuning detector 40 enters the transmit-enable circuit 48 by line 864 which leads through resistor 865 to the base of transistor 866. Another input to the base of transistor 866 is by wire 867 leading through resistor 868 to the collector of transistor 858 in FIG. 2B. The emitter of transistor 866 is connected directly to the 21.5 v. bus. Voltage division between resistor 865 and base resistor 869 forward biases transistor 866 so long as a voltage on line 864 remains approximately at the 20 v. level. The voltage at the collector of transistor 866 is then approximately 20 v. When the voltage on line 864 rises due to output from tuning detector 40, the voltage at the base of transistor 866 may also rise and cut off the transistor. The base voltage of transistor 866 will not rise, however, if transistor 858 is conductive. It will be recalled that transistor 858 is conductive so long as an appreciable A.C. component is present in the output of phase detector 43.

The base of transistor 871 is directly connected to the collector of transistor 866 through resistor 872. The emitter of transistor 871 is supplied by a voltage regulator formed by Zener diode 873 and resistor 874 connected from the 21.5 v. bus to ground. The emitter voltage of transistor 871 is approximately 17 v. positive, hence transistor 871 is cut off as long as transistor 866 is fully conductive. When conduction through transistor 866 is reduced, the voltage at the base of the transistor 871 is reduced, causing transistor 871 to conduct and, in turn, transistor 830 conducts. The collector voltage of transistor 830 falls as conduction increases and this action is hastened by feedback resistor 875, which causes even heavier conduction through transistors 871 and 830. Upon the appearance of an output from tuning detector 40 and the simultaneous absence of an A.C. component in the output of phase detector 43, the collector voltage of transistor 830 is caused to change abruptly from a value of approximately +26 v. to very nearly zero. Diode 831 is then conductive, dropping the anode voltage of diode 817 approximately to zero and preventing further charging of capacitor 815. Diodes 876 and 877, also connected to the collector of transistor 830, are forward biased upon conduction of transistor 830. Diode 876 provides a return path for current through the armature winding 878 of the antenna relay 12, thereby energizing the relay and causing the antenna to be switched from the receiver input to the transmitter output. Conduction of diode 877 permits capacitor 878 to discharge through resistor 879, producing a decaying voltage function at the base of transistor 881 which shortly reaches a value sufficiently less than the voltage applied to the transistor emitter to permit conduction through the transistor. Conduction through transistor 881 is delayed to provide sufficient time for the antenna relay 12 to transfer the antenna to the transmitter output circuit. The output of transistor 881 is applied to the base of transistor 882, the emitter of which is connected through diode 883 to the collector of transistor 803, and the collector of which is supplied from the +75 v. source through resistor 884. The collector of transistor 882 is connected to wire 739 leading to the cathodes of power amplifier 33 in FIG. 3. When transistor 882 is not conducting its collector voltage will have a value of approximately +70 v. This is sufficient cathode bias on power amplifier 33 to completely cut that amplifier off. If transistor 803 in tune-enable circuit 51 is conductive, reverse bias will be removed from diode 883, permitting the rising voltage output of transistor 881 to saturate transistor 882. This causes the voltage on line 739 to drop to approximately 3 v. positive and permits power amplifier 33 to operate at full power.

The transmitter, upon the occurrence of the last described event, is under the full frequency control of the receiver and capable of delivering full output power. It will thus remain until the end of the transmission, which is signalled by release of the microphone switch. With the ground removed from wire 810 transistor 801 in the tune-enable circuit 51 immediately returns to a nonconducting condition and transistors 802 and 803 are, in turn, cut off. Power to all circuits supplied by the 27 v. switch source is removed and those circuits cease to operate, the voltage on line 710 returns to a positive value of about 70 v., cutting off the master oscillator 31 and transistor 882 can no longer conduct because of the reverse bias on diode 883. The antenna is returned to the receiver input circuits by the antenna relay 12 and operation proceeds in the receive mode for as long as may be desired.

The invention claimed is:

1. A plural channel transceiver comprising:
   a crystal controlled superheterodyne receiver responsive to an input frequency and a local oscillator frequency for generating a receiver intermediate frequency;
   a local oscillator for said receiver; said local oscillator including a tuned output circuit having varactor tuning means;
   a plurality of crystals;
   first switching means for connecting a selected one of said crystals to said local oscillator for frequency control;
   second switching means for applying control voltages to said oscillator varactor to tune said output circuit to correspond to the frequency of the selected crystal;
   control means for both said switching means, said control means including a plurality of wires through which circuits are completed in selected paired combinations to operate said switching means;
   a transmitter having an output frequency which varies in response to a control signal;
   means applying a portion of said transmitter output to the input of said receiver;
   an antenna;
   means responsive to a transmit enable signal for connecting said antenna to said transmitter output;
   a reference oscillator for generating a reference frequency;
   a plurality of crystals for said reference oscillator;
   means for selecting a crystal for said reference oscillator; and
   means responsive to said reference frequency and said receiver intermediate frequency for generating said control signal and said transmit enable signal.

2. Apparatus as claimed in claim 1 wherein said switching means includes diodes and means for biasing said diodes.

3. Apparatus as claimed in claim 2 wherein said control for said switching means includes means for altering the bias on selected pairs of diodes.

4. Apparatus as claimed in claim 1 wherein said plurality of crystals are joined terminal to terminal in a series chain; said local oscillator includes first and second common conductors; and said control means additionally includes:
   a plurality of diodes, one electrode of each being connected to successive terminal junctions in said crystal chain, the other electrode of each alternately along said chain being connected to said first or second common conductor;

means normally biasing all said diodes nonconductive; and means for removing said bias from an adjacent pair of diodes thereby conductively connecting to said first and second common conductors the terminals of the crystal located between said diode pair.

5. A plural channel transceiver, comprising:
a superheterodyne receiver including:
  first frequency conversion means including a first local oscillator;
  a first plurality of crystals for said first oscillator;
  means for selecting a particular crystal from amongst said first plurality to determine the frequency of said first oscillator and the first significant figure of the frequency to which said receiver responds;
  second frequency conversion means including a second local oscillator;
  a second plurality of crystals for said second local oscillator;
  means for selecting a particular crystal from amongst said second plurality of crystals to determine the frequency of said second oscillator and the second significant figure of the frequency to which said receiver responds;
  third frequency conversion means including a third local oscillator;
  a third plurality of crystals for said third oscillator;
  means for selecting a particular crystal from amongst said third plurality to determine the frequency of said third oscillator and the third significant figure of the frequency to which said receiver responds;
a transmitter including:
  a master oscillator having an output frequency which varies in accordance with an applied control signal; and
control means for said transmitter including:
  means applying a portion of the output of said transmitter master oscillator to the input of said receiver first frequency conversion means;
  a reference oscillator;
  a plurality of crystals for said reference oscillator;
  means for selecting a crystal for said reference oscillator, whereby said reference oscillator is tuned to a predetermined reference frequency, said reference frequency being equal to the desired output frequency of a predetermined one of said conversion means; and
  a phase detector for comparing the phase of said reference frequency with the phase of the output frequency of said predetermined conversion means for generating said control signal.

6. Apparatus as claimed in claim 5 wherein each of said crystal selection means includes a plurality of diodes and means for selectively biasing said diodes.

7. Apparatus as claimed in claim 6 wherein said biasing means includes a plurality of wires and selected diodes are operatively biased by completing circuits through paired combinations of said wires.

8. A radio transmitter-receiver comprising:
a superheterodyne receiver having a tunable local oscillator for reducing the frequency of an incoming signal to an intermediate frequency;
a reference frequency oscillator;
a phase detector for comparing the phase of signals from said reference oscillator with said intermediate frequency;
a transmitter including a tuned circuit having a capacitive branch, the reactance of which varies with a first control signal and an inductive branch, the reactance of which varies with a second control signal whereby said transmitter output frequency is controlled;
means applying a portion of the output of said transmitter to said receiver as an input signal during transmission;
means operative during reception for rendering said transmitter inoperative;
enabling means for rendering said transmitter operative at the commencement of transmission and for applying a sweep signal to said transmitter to vary the frequency of the same;
means for arresting said sweep signal upon the appearance of said intermediate frequency signal;
means applying alternating outputs of said phase detector to said capacitive branch; and
means applying direct outputs of said phase detector to said inductive branch.

9. A radio-transmitter receiver comprising:
a transmitter including a master oscillator having a resonant circuit the frequency of which varies with an applied control current;
a superheterodyne receiver having a tunable local oscillator for converting the frequency of an incoming signal to a fixed intermediate frequency;
a reference oscillator producing an output at the intermediate frequency of said receiver;
a phase detector for comparing the phase of the intermediate frequency signal from said receiver with the output of said reference oscillator and for providing a control current proportional to the phase difference between said compared signals;
means applying a portion of the output of said transmitter to the input of said receiver during transmission;
means applying the control current provided by said phase detector to said master oscillator resonant circuit to control the frequency of the transmitter output;
a sweep generator for applying a second control current to said master oscillator reactance to adjust the frequency of the output of said transmitter towards the frequency of the input signal to which said receiver responds, and
means for interrupting said second control current upon the appearance of control current from said phase detector.

10. Apparatus as claimed in claim 9 with additional means for coupling alternating current output from said phase detector to said master oscillator resonant circuit to modulate the frequency thereof.

References Cited

UNITED STATES PATENTS

| | | | |
|---|---|---|---|
| 1,891,299 | 12/1932 | Anderson et al. | 325—62 |
| 2,635,183 | 4/1953 | Smith et al. | 325—133 X |
| 3,290,598 | 12/1966 | Thomas | 325—67 |
| 2,131,558 | 9/1938 | Granger | 331—158 X |
| 2,379,395 | 6/1945 | Ziegler et al. | 325—18 X |
| 2,415,318 | 2/1947 | Wheeler | 325—23 |
| 2,958,768 | 11/1960 | Brauer | 325—17 |
| 3,020,421 | 2/1962 | Craiglow | 307—88.5 |
| 3,054,057 | 9/1962 | Bettin et al. | 325—433 X |
| 3,289,096 | 11/1966 | Longuemare et al. | 331—36 X |

ROBERT L. GRIFFIN, *Primary Examiner.*

B. V. SAFOUREK, *Assistant Examiner.*